United States Patent
Julien et al.

(10) Patent No.: US 12,386,682 B2
(45) Date of Patent: Aug. 12, 2025

(54) METHOD AND SYSTEM FOR ON-DEMAND ASSESSMENT OF APPLICATION KERNELS

(71) Applicant: Telefonaktiebolaget LM Ericsson (publ), Stockholm (SE)

(72) Inventors: Martin Julien, Montreal (CA); Dániel Géhberger, Montreal (CA); Mohammad Abu Lebdeh, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/292,881

(22) PCT Filed: Jul. 27, 2021

(86) PCT No.: PCT/IB2021/056830
§ 371 (c)(1),
(2) Date: Jan. 26, 2024

(87) PCT Pub. No.: WO2023/007218
PCT Pub. Date: Feb. 2, 2023

(65) Prior Publication Data
US 2024/0419513 A1    Dec. 19, 2024

(51) Int. Cl.
*G06F 9/52*    (2006.01)
*H04L 41/14*    (2022.01)

(52) U.S. Cl.
CPC ............ *G06F 9/52* (2013.01); *H04L 41/14* (2013.01)

(58) Field of Classification Search
None
See application file for complete search history.

(56) References Cited

U.S. PATENT DOCUMENTS

| 10,540,194 B2 | 1/2020 | Koblents et al. |
| 2018/0157531 A1 | 6/2018 | Bobba et al. |
| 2019/0196853 A1 | 6/2019 | Koblents et al. |

(Continued)

FOREIGN PATENT DOCUMENTS

| WO | 2023007216 A1 | 2/2023 |
| WO | 2023007217 A1 | 2/2023 |

OTHER PUBLICATIONS

Michael R. Carroll, "Get Started with Intel® SDK for OpenCL™ Applications 2017 for Windows*," Aug. 21, 2018, 8 pages, downloaded from https://software.intel.com/content/www/us/en/develop/articles/get-started-with-intel-sdk-for-opencl-applications-2017-windows.html on Jan. 19, 2021.

(Continued)

*Primary Examiner* — William G Trost, IV
*Assistant Examiner* — Christopher P Cadorna
(74) *Attorney, Agent, or Firm* — Nicholson De Vos Webster & Elliott LLP

(57) ABSTRACT

A method and system of assessment of applications in a cloud infrastructure includes generating a kernel assessment application to analyze an application to be executed on the cloud infrastructure, deploying the kernel assessment application in the cloud infrastructure, executing the kernel assessment application in the cloud infrastructure, and storing kernel insights collected from the kernel assessment application to be utilized for executing the application in the cloud infrastructure.

20 Claims, 20 Drawing Sheets

(56) References Cited

U.S. PATENT DOCUMENTS

| | | | |
|---|---|---|---|
| 2019/0312772 A1 | 10/2019 | Zhao et al. | |
| 2020/0174838 A1 | 6/2020 | Li et al. | |
| 2020/0341812 A1* | 10/2020 | McClure | G06F 9/5044 |

OTHER PUBLICATIONS

Shuai Che et al., "Accelerating Compute-Intensive Applications with GPUs and FPGAs," 2008, pp. 101-107, 2008 Symposium on Application Specific Processors (SASP 2008).

Tianqi Chen et al., "TVM: An Automated End-to-End Optimizing Compiler for Deep Learning," Feb. 2018, pp. 1-16, arxiv.org.

Intel Corporation, "Developer Guide for Intel® SDK for OpenCL™ Applications 2017," 149 pages, downloaded from https://software.intel.com/content/www/us/en/develop/documentation/openclsdk-devguide-2017/top/intel-sdk-for-opencl-applications-standalone-version/kernel-performance-analysis/analyzing-opencl-kernel-performance.html.

Tomoaki Hamano et al., "Power-Aware Dynamic Task Scheduling for Heterogeneous Accelerated Clusters," May 2009, 8 pages, 2009 IEEE International Symposium on Parallel Distributed Processing.

Akihiro Hayashi et al., "Machine-Learning-based Performance Heuristics for Runtime CPU/GPU Selection," Sep. 8-11, 2015, pp. 27-36, PPPJ '15.

Kenneth Hoste et al., "Performance Prediction based on Inherent Program Similarity," Sep. 16-20, 2006, pp. 114-122, PACT '06.

Intel Corporation, "Intel® oneAPI Programming Guide," 2020, 86 pages, Chapter 4, downloaded from https://software.intel.com/content/dam/develop/external/us/en/documents/oneapi-programming-guide.pdf.

Written Opinion of the International Preliminary Examining Authority, App. No. PCT/IB2021/056830, Jun. 20, 2023, 6 pages.

International Preliminary Report on Patentability, App. No. PCT/IB2021/056828, Feb. 8, 2024, 10 pages.

International Preliminary Report on Patentability, App. No. PCT/IB2021/056829, Feb. 8, 2024, 8 pages.

International Preliminary Report on Patentability, App. No. PCT/IB2021/056830, Aug. 22, 2023, 14 pages.

International Search Report and Written Opinion, App. No. PCT/IB2021/056828, Mar. 28, 2022, 14 pages.

International Search Report and Written Opinion, App. No. PCT/IB2021/056829, Mar. 28, 2022, 12 pages.

International Search Report and Written Opinion, App. No. PCT/IB2021/056830, Mar. 28, 2022, 12 pages.

Mark Joselli et al., "Automatic Dynamic Task Distribution between CPU and GPU for Real-Time Systems," 2008, pp. 48-55, 2008 11th IEEE International Conference on Computational Science and Engineering.

Rashid Kaleem et al., "Adaptive Heterogeneous Scheduling for Integrated GPUs," Aug. 2014, pp. 151-162, 2014 23rd International Conference on Parallel Architecture and Compilation Techniques (PACT).

Yasir Noman Khalid et al., "Troodon: A Machine-Learning based Load-Balancing Application Scheduler for CPU-GPU System," Oct. 2019, 43 pages, Journal of Parallel and Distributed Computing.

Sohan Lal et al., "SYCL-Bench: A Versatile Cross-Platform Benchmark Suite for Heterogeneous Computing," 2020, pp. 1-16, downloaded from https://www.cosenza.eu/papers/LalEUROPAR20.pdf.

Xiaoyong Tang et al., "CPU-GPU Utilization Aware Energy-Efficient Scheduling Algorithm on Heterogeneous Computing Systems," 2020, pp. 58948-58958, IEEE Access, vol. 8.

Argonne National Laboratory, "The Rodinia Benchmark Suite in SYCL," Jun. 1, 2020, 10 pages, ANL/ALCF-20/6, downloaded from https://publications.anl.gov/anlpubs/2020/06/160240.pdf.

Yuan Wen et al., "Smart Multi-Task Scheduling for OpenCL Programs on CPU/GPU Heterogeneous Platforms," Dec. 2014, 10 pages, 2014 21st International Conference on High Performance Computing (HiPC).

Gingfung Yeung et al., "Horus: Interference-Aware and Prediction-Based Scheduling in Deep Learning Systems," May 11, 2021, pp. 88-100, IEEE Transactions on Parallel and Distributed Systems, vol. 33, No. 1, Jan. 2022.

\* cited by examiner

METHOD AND SYSTEM FOR ON-DEMAND ASSESSMENT OF APPLICATION KERNELS

CROSS-REFERENCE TO RELATED APPLICATIONS

This application is a National stage of International Application No. PCT/IB2021/056830, filed Jul. 27, 2021, which is hereby incorporated by reference.

TECHNICAL FIELD

Embodiments relate to the field of workload management; and more specifically, to the process and system for evaluating application kernels for assisting cloud management systems in assigning processing resources for the application kernels.

BACKGROUND ART

High performance computing (HPC) refers to the field of computing where computing devices are designed for high level performance relative to the general-purpose computers available at the time. Computing devices that have been designed for HPC are sometimes referred to as 'supercomputers.' HPC computing devices have computing power measured often in floating point operations per second (FLOPS), where modern supercomputers can perform a hundred quadrillion FLOPS. Different architectures of processors have been used over time in HPC computing devices. The processors in these HPC computing devices have generally been uniform or general in their operation. However, use of processors of varying types and capabilities for HPC has increased. Specialized processors are referred to as accelerators or hardware accelerators.

Cloud computing is the on-demand availability of compute and storage resources in large data centers that house a large number of computer nodes connected by internal networks. Cloud computing makes these resources available without direct active management by users of the cloud computing services. The cloud computing services are often made available to users remotely via the Internet. Large clouds have functions and compute resources distributed over multiple locations. If the compute resources or functions are positioned proximate to the user and away from a centralized portion of the cloud system such resources and functions can be referred to as edge cloud services. Like HPC systems the hardware utilized by cloud systems can be varied amongst the computer nodes in the cloud system such that different types of processing capabilities are available in the form of general-purpose processors and hardware accelerators.

Hardware acceleration involves the use of specialized computer hardware to perform some functions more efficiently relative to the same functions being performed on general-purpose hardware. An example of hardware acceleration is the use of a graphics processing unit (GPU) to perform graphics functions rather than using a central processing unit (CPU). Accelerators as used herein refers to hardware processing components that have efficiencies for some applications or functions relative to general purpose hardware processing components, e.g., CPUs.

Accelerators can include application specific integrated circuits (ASICs) and similar hardware components. An ASIC is designed or configured to compute a specific set of operations more efficiently than a general-purpose processor that is executing the set of operations in software. Other types of accelerators can include GPUs, functions implemented on field programmable gate arrays (FPGAs), ASICs, and similar specialized hardware components or combinations thereof. Accelerators, such as GPUs and FPGAs, are becoming increasingly popular as a part of high-performance computing and cloud systems.

Accelerators of different vendors have significant differences in hardware architecture, middleware support, and programming models. However, modern programming and execution frameworks for accelerators allow hardware accelerated applications to use different types and variants of accelerators for executing their specialized implementations. These frameworks enable the deployment and execution of the same accelerated function source code across different accelerator devices such as GPUs and FPGAs.

Hardware accelerated applications are applications with computation tasks that can be offloaded to accelerators. They consist of two main components: (1) the code that runs on the general purpose processing components (e.g., CPUs) of a computing device, referred to as a compute node, and (2) one or more functions that can be offloaded to accelerator devices. These accelerated functions can comprise highly parallel computing tasks and are referred to herein as kernels. The kernels that work well on one accelerator will not necessarily perform well on another as the kernels and the associated applications place distinct demands on accelerators, and accelerators from different vendors and of different types vary in their characteristics and performance.

SUMMARY

In one embodiment, a method of assessment of applications is provided for a cloud infrastructure. The method includes generating a kernel assessment application to analyze an application to be executed on the cloud infrastructure, deploying the kernel assessment application in the cloud infrastructure, executing the kernel assessment application in the cloud infrastructure, and storing kernel insights collected from the kernel assessment application to be utilized for executing the application in the cloud infrastructure.

The embodiments further include a non-transitory machine-readable storage medium having stored therein computer program code which when executed by a computer carries out the method of generating a kernel assessment application to analyze an application to be executed on the cloud infrastructure, deploying the kernel assessment application in the cloud infrastructure, executing the kernel assessment application in the cloud infrastructure, and storing kernel insights collected from the kernel assessment application to be utilized for executing the application in the cloud infrastructure.

In another embodiments, a computing node includes a non-transitory machine-readable storage medium having stored therein an application kernel assessment framework, and a set of processors including general purpose processors and accelerators to execute the kernel assessment framework according to a method. The method including generating a kernel assessment application to analyze an application to be executed on the cloud infrastructure, deploying the kernel assessment application in the cloud infrastructure, executing the kernel assessment application in the cloud infrastructure, and storing kernel insights collected from the kernel assessment application to be utilized for executing the application in the cloud infrastructure.

BRIEF DESCRIPTION OF THE DRAWINGS

The embodiments may best be understood by referring to the following description and accompanying drawings that are used to illustrate embodiments. In the drawings.

DETAILED DESCRIPTION

Figure 1:
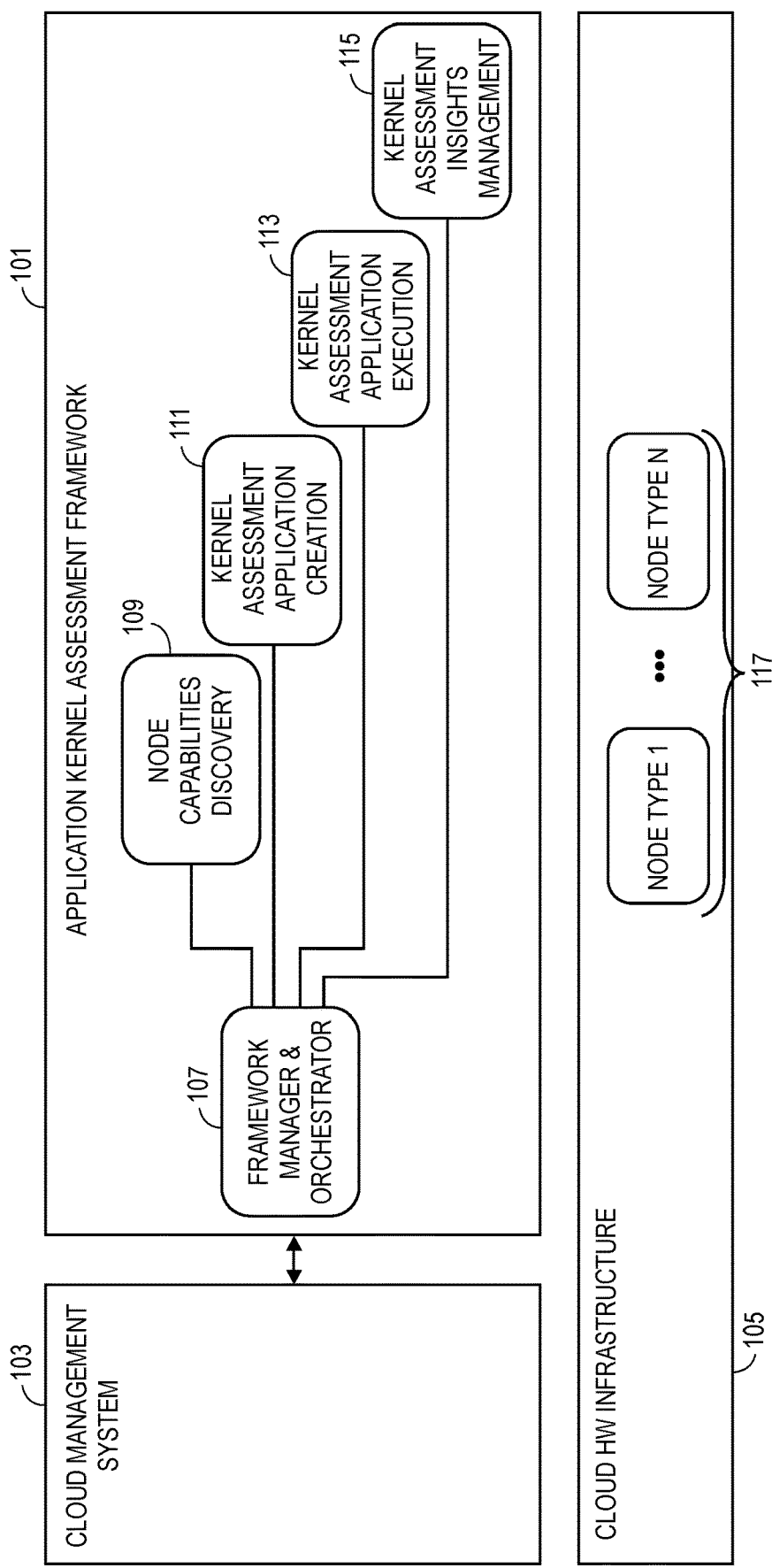
FIG. 1 is a diagram of one embodiment of a high-level view of the application kernel assessment framework and surrounding systems and actors that directly interact with the framework.

The following description describes methods and apparatus for a framework for generating kernel-specific assessment applications for measuring and estimating the characteristics of a hardware-accelerated application's kernels. The framework can include a set of components including a framework manager & orchestrator, node capabilities discovery component, kernel assessment application creation component, kernel assessment application execution component, and kernel assessment insights management component.

The generation of kernel assessment applications involves the extraction of kernels from hardware-accelerated applications, as well as their integration with assessment reference skeleton. The selection of the assessment reference skeletons depends on the node capabilities where the kernel assessment application is meant to execute. The kernel assessment applications are deployed by the framework to collect specific kernel-related insights about the kernels in a cloud environment. The collected kernel insights can be obtained from the framework, and can be used, for example, by cloud management systems for orchestration and workload steering decisions purposes. Node capabilities can be discovered by automated mechanisms that can guide the creation of assessment applications. Application profiling tools can be used as part of the assessment application creation. These tools become part of assessment applications and used for collecting insights during execution. Besides statically provided kernel input data, the original hardware accelerated applications might be instrumented and executed in an end user environment, to collect input data to be used during the execution of the assessment applications.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Parallel computing involves the execution of different functions or components of an application in parallel using different compute resources in cloud computing environments (i.e., on cloud systems) or HPC system. Parallel computing is enabled by the availability of multi-core central processing units (CPUs) and accelerators (e.g., graphics processing units (GPU) and field programmable gate arrays (FPGA)). Accelerators as used herein are special-purpose processing devices designed to speed up parallel and compute-intensive aspects of the applications. Accelerators are becoming increasingly popular means to assist the general-purpose processors (i.e., CPUs) in running applications by offloading complex and intensive computational functions (or tasks) to run on these accelerators. The applications that have computation functions or tasks that can be offloaded to accelerators are referred to herein as hardware accelerated applications. The hardware accelerated applications, referred to herein interchangeably as accelerated applications and hardware accelerated applications, consist of two main components: (1) the code that runs on the host computer (i.e., on the compute node), and (2) one or more functions that can be offloaded to accelerators. These functions that can be offloaded to accelerators often include highly parallel computing tasks and are referred to herein as kernels.

The compute nodes of mobile network infrastructure and similar or related infrastructure such as central cloud or edge cloud computing are highly heterogeneous (e.g., different models of CPU, GPU, and FPGAs from various vendors can be present). The availability of highly heterogeneous compute nodes creates the problem of selecting the best available compute resources on a compute node to run a given kernel in an application, such that the end-user's intention for the efficient execution of the application and its functions is fulfilled. The problem becomes more challenging when taking into consideration that the selection might need to be updated when the application's workload and/or the number of applications on the compute node are changed. One approach when deploying accelerated applications on compute nodes (e.g., in cloud systems) is to ask the application providers to provide information that specifies the accelerator to allocate to the application for hardware acceleration purposes. For instance, a cloud or edge cloud system implementing Kubernetes for container management can require that the developer of an application to be deployed specifies the accelerators to be used for different containers (or Pods) in the manifest file.

The amount of data to be processed is growing in many domains from mobile communication networks to information technology workloads. The processing of the data puts high requirements on the compute infrastructure and the popularity of different hardware accelerators (e.g., GPU and FPGA, DPU (Data Processing Unit)) is rising in this domain. The different kernels place varying demands on accelerators depending for example on their complexity, input, load and memory access patterns. Accelerators on the one hand have significantly different architectures thus they excel at different tasks. On the other hand, accelerators from the same class also have different architectures between vendors and between generations. As a result, specific kernels may perform significantly differently on different accelerators.

To support the utilization of accelerator devices, different types of software can be utilized including for example CUDA by Nvidia, OpenCL SYCL by Khronos group, and the oneAPI. This software varies in a sense that some, e.g., OpenCL, require a specific definition of kernels as software functions with well-defined application programming interfaces (APIs) and input parameters. Other software for supporting accelerators, such as the oneAPI, use single source programming. In this case the kernels are more inherent parts of the main source code. During the compilation process the compiler toolchain is used to separate and appropriately compile the components of the code that are to execute on general purpose processors and accelerator components. An interface for the accelerated application being compiled is also automatically created with automatically discovered parameters and memory management. To enable running kernels on different acceleration devices, a combination of online and offline compilation can be used. The part of the application intended for the general purpose processor (e.g., CPU) of the computing node is compiled by a compiler into an executable format, while the functionality for the accelerators is compiled into an intermediate representation (IR), e.g., a standard portable intermediate representation (SPIR-V) or LLVM intermediate representation (IR). The different components are packaged into a fat binary. The IR parts are then just in time (JIT) compiled to the target device in runtime enabling optimization for the actual accelerator.

It is a challenging problem for cloud management systems to select computing nodes (e.g., servers) with appropriate accelerators for applications. One level deeper, the kernels of hardware-accelerated applications need to be assigned to accelerators available in the selected computing node environment as well. For proper decision making the system needs to know the performance and other characteristics (e.g., energy consumption) of kernels on the available accelerator devices.

For creating a baseline for different computing nodes, various benchmark software suites can be applied to the software frameworks for evaluating and comparing the hardware capabilities of computing nodes. In addition, development tools for OpenCL enable running OpenCL kernels with pre-defined parameters in input files. Performance prediction can also be used to evaluate hardware capabilities of computing nodes using microarchitecture-independent characteristics of the application to predict its performance on the general-purpose processor of a specific compute node. The microarchitecture characteristics are measured by running an instrumented binary of the application, which is generated using an instrumenting tool. The measured characteristics are related to the characteristics of the previously profiled programs from a benchmark suite. Then based on the similarity of the application of interest with those programs, predicting the performance of the application of interest can be performed. It is possible to extend the functionalities of a JAVA JIT compiler and runtime capabilities to automatically select a preferred computing resource (i.e., either a general-purpose processor (CPU) or accelerator (e.g., GPU)). This is achieved by collecting features from compiler and runtime and then using a binary prediction model to decide where to run an accelerated application.

Profilers such as Intel VTune can be used for profiling hardware accelerated applications. Profiling the kernels themselves of a hardware accelerated application is challenging because the profiler and different measurement tools are not able to separate the resources used for the execution of the kernels from the main application.

These hardware evaluation options have limitations and deficiencies. To optimally select a compute node and then accelerators for the kernels of accelerated applications, the management system requires deep understanding of execution characteristics. Data needs to be available for example about execution latency, throughput, and energy consumption. Since kernels are an integral part of accelerated applications such detailed data collection is challenging. Generic profilers (such as Intel VTune) can record some of the metrics for individual kernels running as part of applications by parsing the low-level communication towards the accelerator devices. While some metrics, such as kernel execution latency can be recorded this way, others, like energy consumption typically cannot be. Furthermore, profilers add significant overhead and complexity to the execution and as a result they are not suitable for use in production environments even to collect the available metrics. Running complete applications in a test environment requires load generators or complete test cases to function. Manual profiling using such profilers cannot be realistically scaled to the amount of configuration options and scenarios available in cloud environments.

The embodiments overcome these limitations of the art. In the embodiments, a system and method for kernel level insight collection (e.g., performance, power efficiency, etc.) via dynamically created kernel assessment applications is presented. Kernel assessment applications are single-purpose computer executable programs that contain one or more extracted kernels from an application packaged together with system bring up tools, input data handling and insight collection tools (e.g., a profiler pre-configured to measure certain parameters of the kernel or the execution of the kernel). The purpose of kernel assessment applications is to make extracted kernels executable on different server nodes with different accelerators and load conditions in the system. By being able to execute individual kernels, existing profiling and measurement tools can be used to collect insights with minimum overhead. The collected insights then can be used by a cloud management system for orchestration and local accelerator selection.

As part of an application kernel assessment framework node capabilities can be discovered automatically, making the creation of custom kernel assessment applications possible. Data can be collected from end-user environments to be used as input for the kernels inside the kernel assessment applications.

The embodiments provide numerous advantages including enabling on-demand and automated insight collection of compute kernels, independently from the main application, extracted kernels can be automatically evaluated in multiple different conditions and environments at scale, kernels can be tested on different node types (servers with different hardware), kernel input data can be collected from end-user environment and used for kernel evaluation, and the embodiments enable cloud management systems to dynamically and autonomously learn insights about individual hardware-accelerated application kernels deployed on the infrastructure, which can be used for the purpose of scheduling resources to meet the high-level objectives of the system such as performance optimization.

The embodiments provide a method and system to enable cloud management systems and similar cloud management system with the capability to perform on-demand application kernel assessments on scalable and heterogeneous data center and cloud systems. The embodiments enable systems to dynamically and autonomously collect insights from hardware-accelerated application kernels deployed on a system infrastructure. The collected kernel insights can later be used by cloud management system to further enhance, for example, application deployments and resource management, potentially improving application performance and overall system efficiency.

As applications are submitted to cloud systems for deployment, the embodiments provide an application Kernel Assessment Framework, referred to herein as the "framework," to perform the on-demand characterization of any kernel that would be present in an application. The characterization process describes each application kernel in enough detail that, for example, a cloud system can leverage the collected kernel insights to better schedule hardware and software resources according to the specific intended features of the kernel, as well as its detected performance or overall efficiency characteristics. In that context, kernel assessment is the process of collecting useful insights about an application kernel, for example related to performance, usage, energy consumption, processing complexity, hardware and software compatibility, system efficiency and similar features.

The framework allows cloud management systems to request the application kernel assessment framework to perform an analysis of the cloud system infrastructure capabilities, especially related to hardware and software capabilities of the system's computing nodes (e.g., server hosts). The framework also enables cloud management systems to request the application kernel assessment framework to extract application kernels from deployed hardware-accelerated applications, in order to generate new purpose-built kernel-specific assessment applications for characterizing a kernel application under different working conditions, e.g., leveraging different hardware accelerators, application programming interfaces (APIs), drivers, execution environments, and similar features.

Leveraging specifically designed kernel assessment applications, these assessment applications can then be deployed and run individually, and independently of the original owning application, to gain specific insights on the kernel itself. The assessment applications can, for example, determine dynamically the most efficient way of performing application deployment scheduling and hardware resource allocation through high-level orchestration systems. Enabling automated application kernel assessment involves the capability of executing the kernel of interest without the need for running the original application itself.

As the kernel insights would be collected by the framework, the kernel insights would be made available to cloud management systems to use in order to potentially improve its own operations, e.g., application deployment and resource allocation.

FIG. 1 is a diagram of one embodiment of a high-level view of the application kernel assessment framework and surrounding systems and actors that directly interact with the framework. The related systems include a cloud management system 103 and cloud hardware infrastructure 105. The cloud management system provides the main orchestration logic required to manage a cloud system. The cloud management system also implements orchestration of the resources made available by the application kernel assessment framework 101. The orchestration logic handled by a cloud management system 103 interfaces with the framework 101 to allow the framework 101 to discover the cloud infrastructure 105 capabilities, generate kernel assessment applications from original hardware-accelerated applications, deploy and run kernel assessment applications to collect kernel insights, and make the collected kernel insights available to the cloud management system 103, as needed.

The cloud management system 103 can perform these tasks on-demand, as needed. The cloud management system 103 has autonomy to request the framework 101 to perform the tasks related to kernel assessment on certain nodes of its managed infrastructure 105. The on-demand aspect of the framework 101 allows for the flexibility for the cloud management system 103 to request the framework to discover its hardware infrastructure, generate kernel assessment applications from original hardware-accelerated applications, and perform kernel-specific insights collection.

The application kernel assessment framework 101 encompasses the core logic required for enabling the assessment of application kernels. The framework can perform several key tasks, which have been mapped to different components of the framework 101 architecture. However, it should be noted that the components of the framework 101 are provided by way of example and not limitation. The function of the components can be differently organized into components and sub-components consistent with the principles, processes, and structures of the embodiment. The main components of the framework architecture can include a framework manager and orchestrator 107, node capabilities discovery component 109, kernel assessment application creation component 111, kernel assessment application execution component 113, and kernel assessment insights management component 115.

The cloud hardware infrastructure 117 is a set of computing nodes 117 and related resources on which the accelerated applications and the kernel assessment applications execute. A 'set,' as used herein refers to any positive whole number of items including one item. The infrastructure 105 provides the resources to deploy and run the accelerated applications as well as kernel assessment applications. The cloud management system 103 can select the computing nodes 117 where accelerated applications execute and where kernel assessment can be performed by the framework. Different computing nodes 117 can provide different hardware, e.g., general purpose processors (e.g., CPUs), accelerators (e.g., GPUs, smart network interface cards (NICs), and FPGAs), as well as different software execution environments, e.g., host native, virtual machines, and containers, the cloud management system 103 and framework 101 consider the potential impact of performing kernel assessment across different node types. An application deployed on different computing nodes of different types (i.e., having different hardware and/or software configurations) can lead to different kernel performance characteristics, as well as different overall efficiency.

In the embodiments, the cloud management system 103 provides information to the framework 101 on the computing nodes 117 to use for kernel assessment purposes. A cloud hardware infrastructure 105 can provide different nodes with different hardware devices, capabilities and configurations. The cloud management systems 103 enable the framework 101 to discover the capabilities of each of its different computing node 117 types. Having an understanding of the different available node types enables the framework 101 to generate kernel assessment applications more tailored to each computing node 117 type.

The framework manager and orchestrator 107 component provide software support functions, e.g., related to connectivity, security, authentication and authorization, logging, traffic management, and similar functions. The framework manager and orchestrator 107 coordinates the operations of the other components and interfaces with external components like the cloud management system 103.

The node capabilities discovery component 109 manages the discovery of the capabilities of the computing nodes 117 in the cloud hardware infrastructure 105. Computing nodes 117 execute end-user applications, as well as the accelerated applications and kernel assessment applications. As cloud hardware infrastructures are becoming more and more heterogenous, several different types of computing nodes 117 can be present in the same cloud system. For example, computing nodes can be equipped with different general-purpose processor (e.g., CPUs from different vendors, with varying number of cores, instructions, cache sizes, and similar varied characteristics), and also with zero or more hardware accelerators. Hardware accelerators are also heterogenous in nature (e.g., GPU, FPGA, and similar accelerators), and also in capabilities (e.g., an Intel GPU and an NVIDIA GPU can have different architectures and capabilities). Besides the hardware, the available and supported software versions may also differ. For example, an NVIDIA GPU might be used with certain versions of oneAPI, and at the same time used with NVIDIA's CUDA framework.

The application kernel assessment framework 101 uses information about different computing node 117 types in the cloud hardware infrastructure 105 for building and executing the right kernel assessment applications. The information needed can be implementation-dependent and influenced by, for example, the exact available hardware types or used virtualization and cloud technology. For example, in an Infrastructure as a Service (IaaS) type of deployment, the software framework to be used can be dependent on the application, while in a Platform as a Service (PaaS) and especially in a Software as a Service (SaaS) setting, the software environment can be restricted by the computing node 117 type.

The required information about the hardware and software capabilities can be supplied directly by the cloud management platform 103. In some embodiments, the information can be stored in the hardware and software capabilities repository of FIG. 3. Here after, we present a more generic solution for discovering the capabilities.

Figure 2:
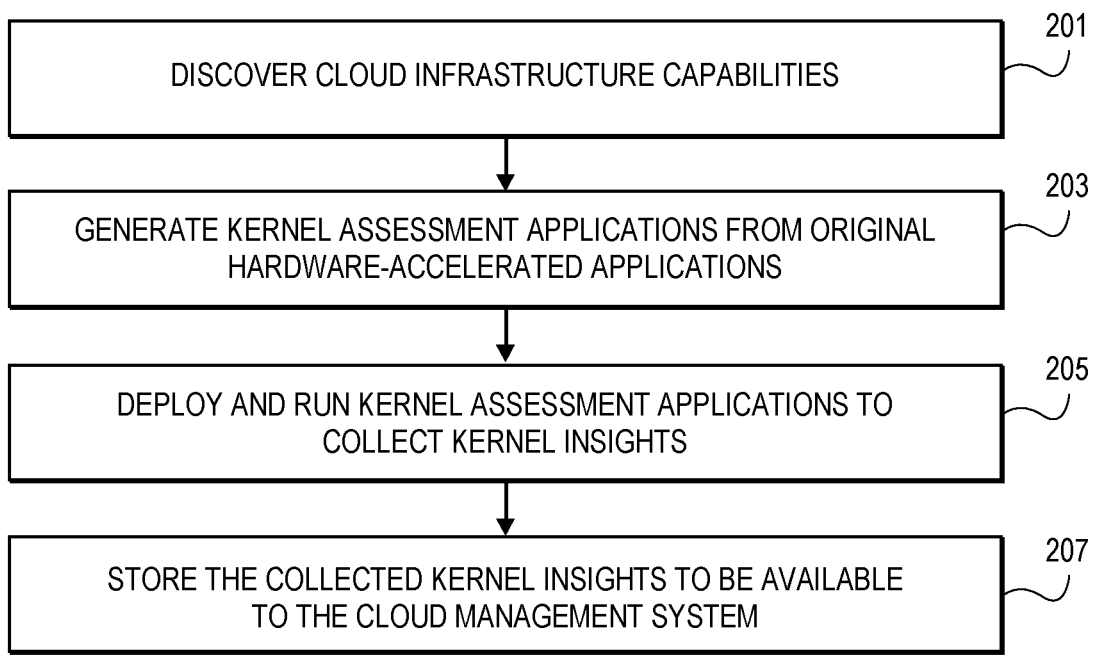
FIG. 2 is a flowchart of one embodiment of the overall process of the application kernel assessment framework.

FIG. 2 is a flowchart of one embodiment of the overall process of the application kernel assessment framework. The process is a high-level overview involving the operation of each of the components of the framework 101. The process can be triggered by a request of the cloud management system 103 related to an accelerated application deployment or under similar circumstances. The framework 101, e.g., the node capabilities discovery component 109, can discover cloud infrastructure 105 capabilities by querying each computing node 117, accessing capabilities information stores, or similarly collecting the capabilities of each computing node 117 (Block 201). Any protocol or intermediate technology can be utilized for collecting the capabilities of the computing nodes 117.

The framework 101 can generate kernel assessment applications for the accelerated application (Block 203). Example mechanisms or generating the kernel assessment applications are discussed further herein in reference to FIGS. 6-10. The kernel assessment application generation can be performed by the kernel assessment application creation component 111. Once the kernel assessment applications have been generated, then the framework 101 can deploy and execute the kernel assessment applications (Block 205). The kernel assessment applications can then collect kernel insights. The process of executing the kernel assessment applications is described herein in relation to FIGS. 11-14. The collected kernel insights are stored and managed to be made available to the cloud management system 103 (Block 207). The storage and management of the kernel insights can be performed by the kernel assessment insights management component 115. The operation of the kernel assessment insights management component 115 is further discussed herein in reference to FIGS. 15 and 16.

Figure 3:
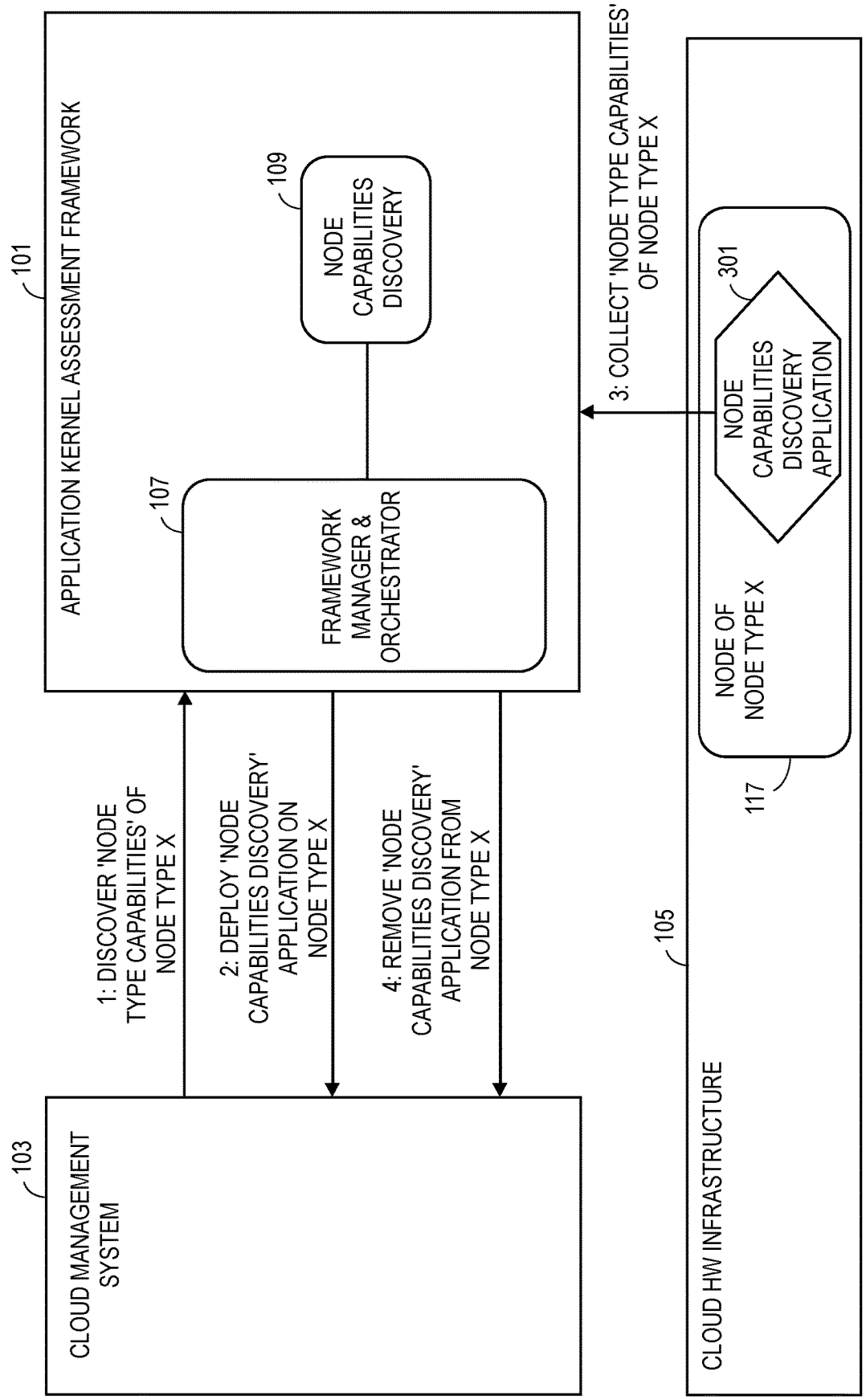
FIG. 3 is a diagram of one embodiment of the operation of the node capabilities discovery component.

FIG. 3 is a diagram of one embodiment of the operation of the node capabilities discovery component 109. The cloud management platform 103 instructs the framework 101 (at step 1) to discover a certain node type (e.g., node type X). This can be, for example, triggered if a new node 117 type is added to the infrastructure 105 or an existing node 117 type has been upgraded. In turn, the framework 101 requests the cloud management platform 103 to deploy a given node capabilities discovery application 301 on the identified computing node 117 type (example step 2). The node capabilities discovery application 301 is deployed on the cloud hardware infrastructure 105 in a specific computing node 117 with node type X. In some embodiments, the framework 101 does not need to know the exact node instance to use for the deployment of the node discovery application 301, instead it can be left to the cloud management system 103 to map a node type to a specific node 117 instance available on its managed infrastructure 105.

The node capabilities discovery application 301 interacts with the computing node 117 to discover the details regarding the available hardware present in node type X, as well as the available software support, if applicable. The discovered capabilities are then reported to the framework 101 (example step 3), where they can be kept in a local storage structure, e.g., a hardware and software capabilities repository. After the collection is done, the framework 101 instructs or requests that the cloud management platform to remove the discovery application (example step 4). After this process is completed, the cloud management system 103 can refer to the framework 101 for the node type information, as the other framework components can directly access the node type capabilities, as needed.

Figure 4:
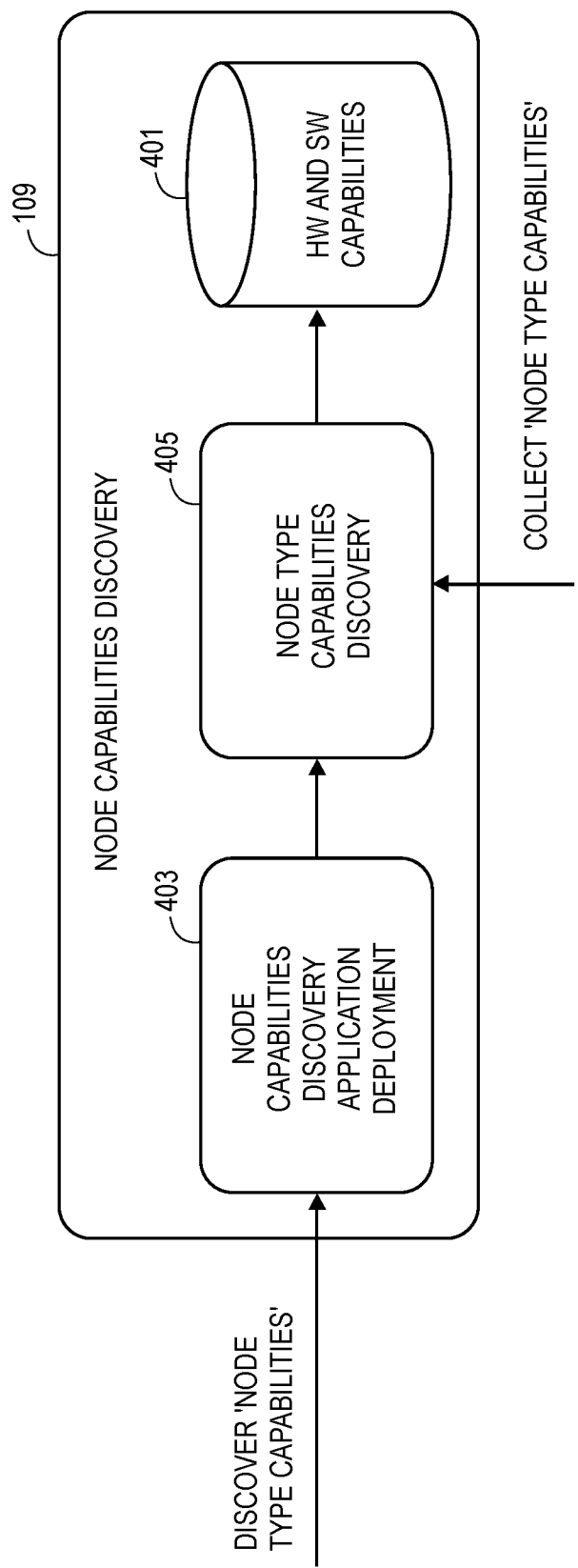
FIG. 4 is a diagram of one example embodiment of the node capabilities discovery component.

FIG. 4 is a diagram of one example embodiment of the node capabilities discovery component 109. The example illustrates one embodiment of the internal components of the node capabilities discovery component 109. During the discovery process, the collected hardware and software capabilities are stored in a data store 401 to be used later for the creation of kernel assessment applications. The node deployment process can be managed by a node capabilities discovery application deployment component 403, which interfaces with the incoming requests for discovery. The node type capabilities discovery component 405 collects the node type capabilities and marshals them for storage in the repository 401.

Figure 5:
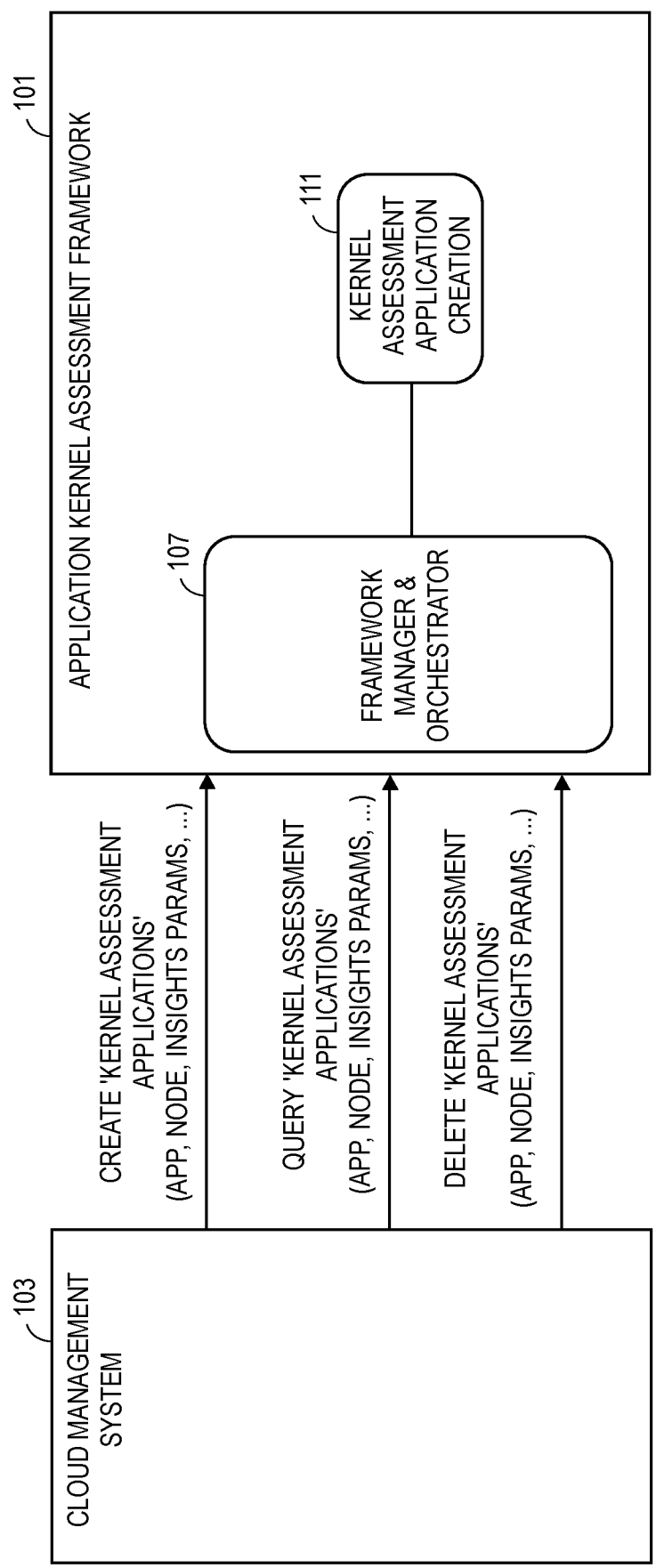
FIG. 5 is a diagram of one embodiment of the operation of the kernel assessment application creation component.

FIG. 5 is a diagram of one embodiment of the operation of the kernel assessment application creation component. The kernel assessment application creation component 111 is responsible for the generation of the specialized kernel assessment applications. The cloud management system 103 can request the creation of specialized kernel assessment applications to assess the kernel(s) of a hardware-accelerated application. For example, when hardware-accelerated applications become available for deployment by the cloud management system 103, the cloud management system 103 can request the application kernel assessment framework 101 to create assessment applications to better evaluate the characteristics of the kernels used by the submitted applications. This process can be initiated with a 'create' function call that identifies the application, target computing node, insights parameter, and similar parameters. The framework manager and orchestrator can interface with the cloud management system 103 for this function call.

Once the kernel assessment applications are generated by the framework 101, i.e., by the kernel assessment application creation component 111, the cloud management system 103 can query the framework 101 to see the kernel assessment applications that were generated by the framework 101. The query can be performed via a call to a 'query' function that identifies the application, target computing node, insights parameters, and similar parameters. In some embodiments, where several kernel assessment applications have been generated for the same single application, e.g., for the purpose of evaluating a kernel on different hardware accelerator or different execution environments, the cloud management system 103 can query the framework 101 to enable the cloud management system 103 to compare the generated kernel assessment applications, along with their specific capabilities. In some embodiments, the framework 101 can also support a 'delete' function call to enable the cloud management system 103 to request that a kernel assessment application to be deleted by specifying the application, computing node, insights parameters and similar parameters.

In one example embodiment, the 'Create Kernel Assessment Application(s)' operation can be used to create new kernel assessment applications. Such creation requests can be made on-demand by a cloud management system 103 and parameterized to fulfill specific kernel assessment needs. For example, it is assumed that the operation can minimally support the following set of parameters application, node type, and insights parameters.

The application parameter corresponds to a hardware-accelerated application that can be deployed by the cloud management system 103, and for which the cloud management system 103 requests to know more about the characteristics of the implemented application's kernels across the available cloud system hardware accelerators. The application can be provided as a stand-alone deployable package, or as a source code or binary bundle. The original hardware-accelerated applications can be copied from the cloud management system 103 to the framework 101, where it can be stored in a hardware-accelerated applications repository. In other embodiments, the framework can refer to the original application as stored in the cloud management system infrastructure. The Node Type is an identifier to provide information on the type of computing node 117 (e.g., a server node) intended to be used for application deployment. A node type can provide specific hardware, e.g., CPUs, GPUs, SmartNICs and FPGAs, as well as specific software execution environment, e.g., host native, virtual machines, containers, virtualization layers, and similar environments. In some embodiments, a computing node instance can be a server host of a particular node type. The framework 101 can get information on the available hardware and software of computing node types to generate the most appropriate kernel assessment applications for determining kernel characteristics across heterogeneous environments. An application deployed on different node types having different hardware and/or software configurations can lead to different kernel performance characteristics, as well as different overall efficiency.

Insights parameters are those parameters that can be used to provide further details on the creation of kernel assessment applications. For example, the insights parameters can be used to select the preferred intended hardware accelerator to use for the kernel assessment, or the type of kernel assessment to perform, e.g., for performance evaluation, for compatibility testing, or for resource optimization tuning. One or many kernel assessment applications can be created for the same hardware-accelerated application, e.g., depending on the different hardware accelerators or the different execution environments available on a node type, or even depending on the intended insights required on the kernels. For each generated kernel assessment application, a specific description can be provided. The description can be used to identify, for example, the supported hardware accelerators and execution environment. The generated applications can support a certain number of parameters that can be dynamically passed during the execution of the application, e.g., to select dynamically the kernel input data to use, or to fine tune the kernel assessment logic of the application.

The 'query kernel assessment application(s)' operation can query the framework 101 to produce a list of previously generated kernel assessment applications. Where a cloud management system 103 requested the creation of kernel assessment applications, this operation allows the cloud management system 103 to query the framework 101 in order to get the list of kernel assessment applications created for the corresponding submitted application. The operation enables a cloud management system 103 to query the framework 101 on the previously created kernel assessment applications. This provides on-demand aspect, by enabling the cloud management system 103 to compare the different generated kernel assessment applications and use them as required by the cloud management system 103.

Each kernel assessment application can come with a specific description, detailing its capabilities regarding kernel assessment. For example, the cloud management system 130 can query the framework 101 and see the kernel assessment applications generated for certain nodes, for specific accelerators, or using determined execution environments. Based on the information obtained from the query, the cloud management system can better determine all the deployment options for certain applications, as well as the options for requesting the framework 101 to perform kernel assessment using a specific kernel assessment application. Parameters similar to the 'create' operation can be used for filtering the 'query' operation.

The 'delete kernel assessment application(s)' operation can delete the previously generated kernel assessment applications. This operation can be used for clean-up purposes as node types or applications are no longer necessary. Leveraging these three basic operations, a cloud management system 103 can have more flexibility regarding the generation of purpose-build kernel assessment applications, as well as more freedom regarding the execution of such applications for their intended usage of kernel-related insights.

Figure 6:
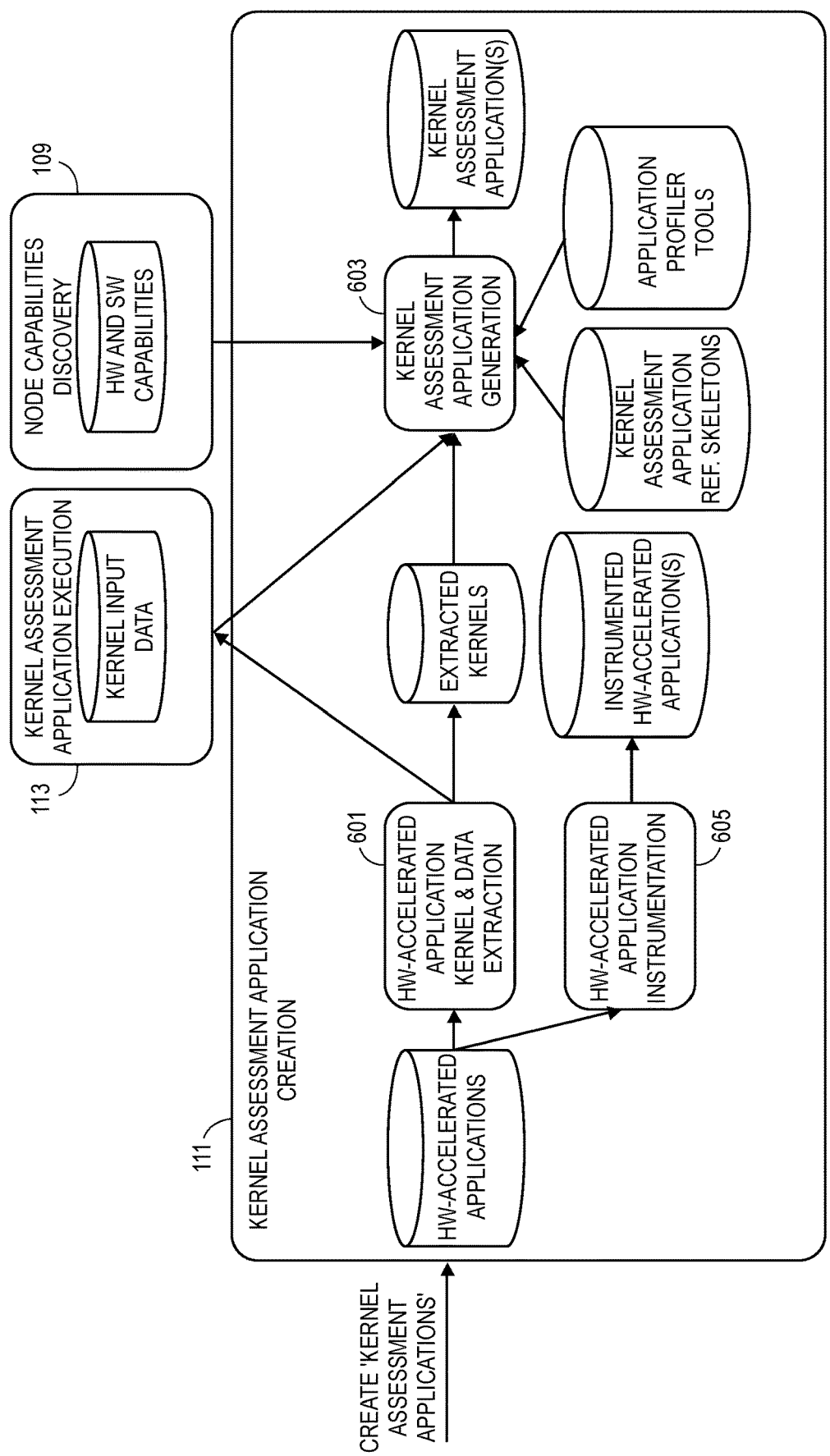
FIG. 6 is a diagram of a high-level internal architecture of the kernel assessment application creation component.

FIG. 6 is a diagram of a high-level internal architecture of the kernel assessment application creation component 111. The operation of the kernel assessment application creation component 111 is illustrated and described in relation with the 'create' operation implemented by the framework 101 to generate the kernel assessment applications. In the illustrated kernel assessment application creation component 111, the tasks or functions are illustrated as components, which include a hardware accelerated application kernel and data extraction function 601, a kernel assessment application generation function 603, and a hardware accelerated application instrumentation function 605. Various related data and data stores are also illustrated.

The hardware accelerated application kernel and data extraction function 601, also referred to herein as the kernel extraction function, extracts the kernels in a hardware accelerated application along with their dependencies (e.g., non-local variables and definitions of called functions). The original hardware accelerated applications are provided by the cloud management system and can also be stored in the component for further assessment application creations with different requirements. The extracted kernels can be packaged subsequently into kernel assessment applications that can be compiled and executed independently from the hardware accelerated application.

The kernel extraction component performs kernel code extraction. The framework and this function can automatically extract the kernel code and its dependencies (e.g., non-local variables and functions called by the kernel) from the hardware accelerated application source code. The function can store the extracted information in an 'Extracted Kernels' repository, so that it can be used for creating kernel assessment applications.

There are several processes that can be applied for extracting the kernels. In one embodiment, the process extracts the source code of the kernels along with their dependencies from the source code of the hardware-accelerated application (i.e., high-level programming languages). Another approach is to extract them as intermediate representation code, e.g., the SPIR-V intermediate representation, from the hardware-accelerated application binaries. Intermediate representation code can also be analyzed and modified the same way as high-level programming languages.

The kernel extraction function can also perform kernel input data extraction. The execution of a kernel requires input data to process. The kernel input data can be provided through different means, such as, extracted static input data, kernel input data type, and application monitoring of input data. The required kernel input data can be extracted directly from the original application itself, e.g., when the input data would be provided as static input to the application. The input data types of the kernel can be extracted from the original application. In such a case, the kernel can be exercised based on the knowledge of the required data types. The kernel input data repository can include multiple generic common data types already available and compatible with the required kernel input data type, in order to characterize the kernel. The input data itself can be provided by the framework, or populated through other means, potentially also by the cloud management system. Application monitoring of input data relates to the process of monitoring the original hardware-accelerated application in its typical or real execution environment and is able to log the typical input data used to exercise its kernel(s). By looking at real typical input data, it can lead to more straight forward and more realistic kernel assessment applications for performing kernel characterization over different hardware accelerators.

Figure 7:
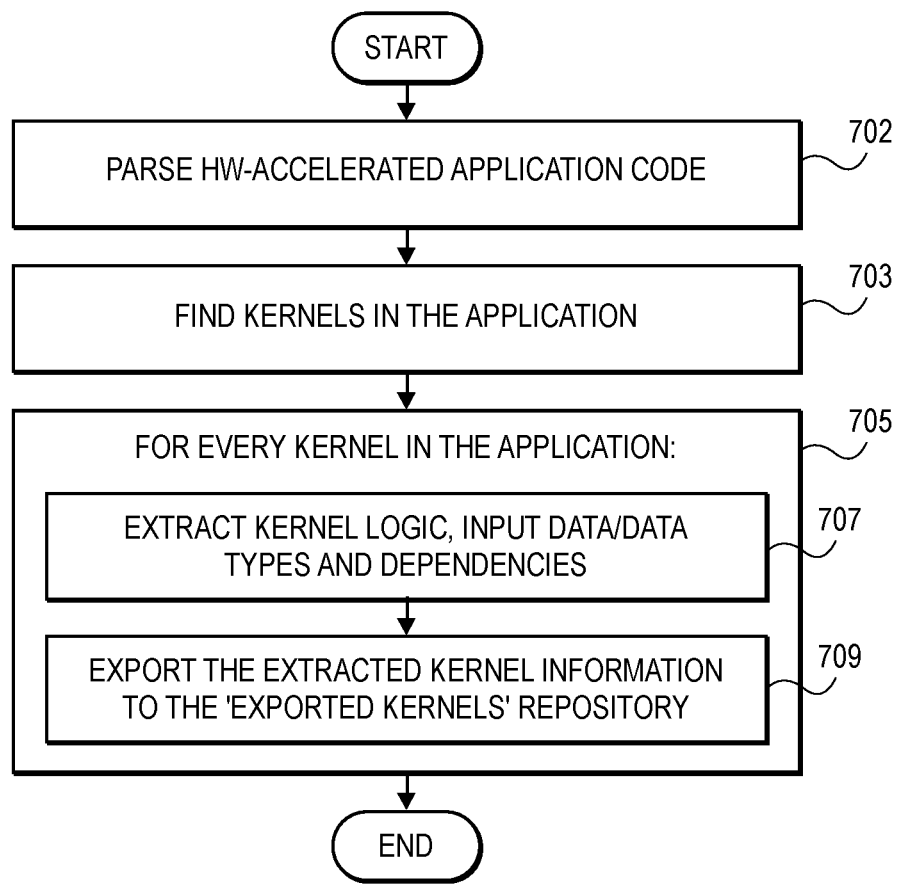
FIG. 7 is a flowchart of one embodiment of the kernel extraction procedure.

FIG. 7 is a flowchart of one embodiment of the kernel extraction procedure. The kernel extraction procedure analyzes (e.g., parses) the hardware accelerated application (Block 701) and finds the locations of the definitions of kernels (Block 703). The implementation can be dependent on the kernel extraction approach used in the framework. For example, if the framework utilizes the source code of the hardware-accelerated application to extract the kernels, then this can be implemented by parsing the source code or navigating the abstract syntax tree generated by the compiler. For every kernel (Block 705), the process parses the kernel code and identifies the dependencies such as the accessed non-local variables, called functions, and user-defined data types (e.g., user-defined classes) (Block 707). Identifying and resolving dependencies is a recursive process. The process saves the extracted kernel and its dependencies into in the extracted kernels repository (Block 709).

If the extraction approach is implemented using intermediate representations (e.g., SPIR-V), the application is in practice a so-called "fat binary." A fat binary stores the kernels in intermediate representation in different sections. By parsing the sections, the kernels can be found, extracted and added to the extracted kernels repository.

Returning to FIG. 6, the kernel assessment application generation function 603 operates to generate kernel assessment applications that are meant to characterize the kernels implemented within hardware-accelerated applications. Depending on the accelerated application, the selected node type and the required kernel insights, one or more kernel assessment applications can be generated. The generated assessment applications can be built from reference skeletons, which can correspond to the selected node's capabilities and intended kernel insights. The generation of kernel assessment applications can be dependent on the hardware and software capabilities of a node type to select one or more reference skeletons. For example, while one reference skeleton can be used for supporting a GPU from vendor X, another reference skeleton can be supporting another vendor GPU.

The embodiments can insert the kernel code, its dependencies and its required input data into a reference skeleton to generate a kernel assessment application. Once generated, the application is stored in the kernel assessment applications repository. The generated kernel assessment application can be compiled and executed independently from the original hardware accelerated application. The kernel assessment application can be used by the cloud management system to profile the kernels and collect insights without the need to run the hardware accelerated application. A kernel assessment application can include a single kernel, more complex kernel assessment application can also include multiple kernels, for example to evaluate the potential performance interference between different kernels.

The kernel assessment application generation function 603 can use the following inputs to generate one or more kernel assessment applications: input application's extracted kernels, kernel assessment application reference skeletons, application profiler tools, information about the input data, hardware and software capabilities, and similar information. An assessment application skeleton is a template or a blueprint that determines the semantic and structure of the kernel assessment application, profiler settings, startup scripts, data collection scripts, input data configurations (e.g., load data on-demand from file, database, or compiled in the application). Skeleton applications are single purpose insights collecting applications that have to be specialized with one or more extracted kernels to function. Different reference application skeletons can be used to accommodate the support for different hardware accelerators, different APIs, different versions of device drivers, different execution environments, as well as different insights to be collected on the kernel. For example, one assessment skeleton can be designed to record kernel execution time on a GPU, another can be used on an FPGA, a third can measure energy consumption, and a fourth can investigate performance interference among multiple kernels. Some insights can be directly provided through the reference skeletons (e.g., directly measuring the execution time of a kernel).

Application profiler tools can be used for insights such as detailed queuing and execution time, energy consumption, or even code complexity information such as floating-point operations per second (FLOPS). Kernel assessment applications can be created with integrated profiling tools in order to collect the required insights on the kernels. Such tools include, for example, Intel VTune, turbostat by Debian, or similar tools. The framework maintains a set of supported profilers along with metadata in the profilers repository. The metadata describes what insights each profiler can collect. During the generation, profilers along with configurations can be selected based on the required insights.

Information related to the kernel input data can include information on data types and how data can be retrieved during execution. Hardware and software capabilities of node types can include types of processors, execution environment, software supported, and similar capabilities.

Figure 8:
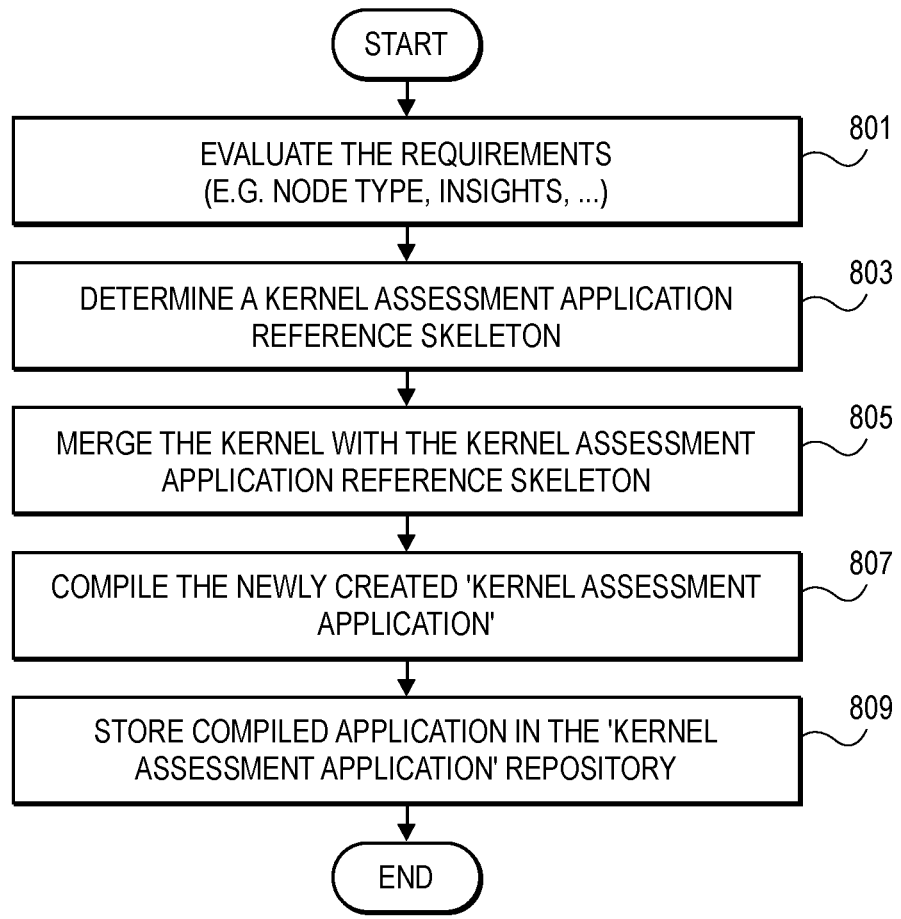
FIG. 8 is a flowchart of one embodiment of a process of the assessment application generation.

FIG. 8 is a flowchart of one embodiment of a process of the assessment application generation. The requirements are evaluated that include, for example, the insights parameters provided by the cloud management system (Block 801). These parameters identify the insights that the cloud management system requires for its own logic to function. Another example requirement from the cloud management system is one or more node types to generate assessment applications for. The generation function can then select skeletons that are capable of providing the requested insights and can be executed on the specified node types using the hardware and software capabilities identified for the target computing node types (Block 803). The extracted kernels are then merged with or inserted into the selected skeletons (Block 805). For this process to work, the input (and output) parameters of the kernel are required to be properly instantiated, initialized, and in some cases copied over to the memory of the hardware accelerator. For these steps, information from the kernel input data store can be used. The newly created assessment application is compiled (Block 807) and stored in the assessment application repository (Block 809).

An OpenCL-based pseudo code example showing how a reference skeleton application can be used to measure the execution time of a kernel:

```
// generic initialization
CreateContext( )
```

```
CreateQueue(device)
// initializing the kernel
CreateKernel(extracted kernel)
// initializing the data
LoadDataInformation( )
for (every input and output data)
    CreateBuffer(...)
for (every input)
    LoadDataFromDataStore(...)
    EnqueueWriteBuffer(...)
    SetKernelArg(...)
//Execution
```

Returning to FIG. 6, the instrumenting hardware accelerated application function 605 profiles a kernel to collect meaningful insights requires feeding the kernel with realistic and representative input data. The framework can automate capturing the input data that is used to invoke a kernel, while the hardware-accelerated application is executed in the real environment. To do so, the framework can instrument the hardware-accelerated application by adding API calls that can capture the values of kernels' inputs and store them into the kernel data input repository so that the same data can be used later in profiling the kernel separately from the application. The generated instrumented applications are stored in the instrumented applications repository.

The embodiments support multiple ways for creating such an instrumented application. One option is to enable the monitoring of data exchanged through the accelerator specific software libraries or the associated driver. For example, in case of an accelerated application using OpenCL, a tool called OpenCL Intercept can be used for the purpose.

Figure 9:
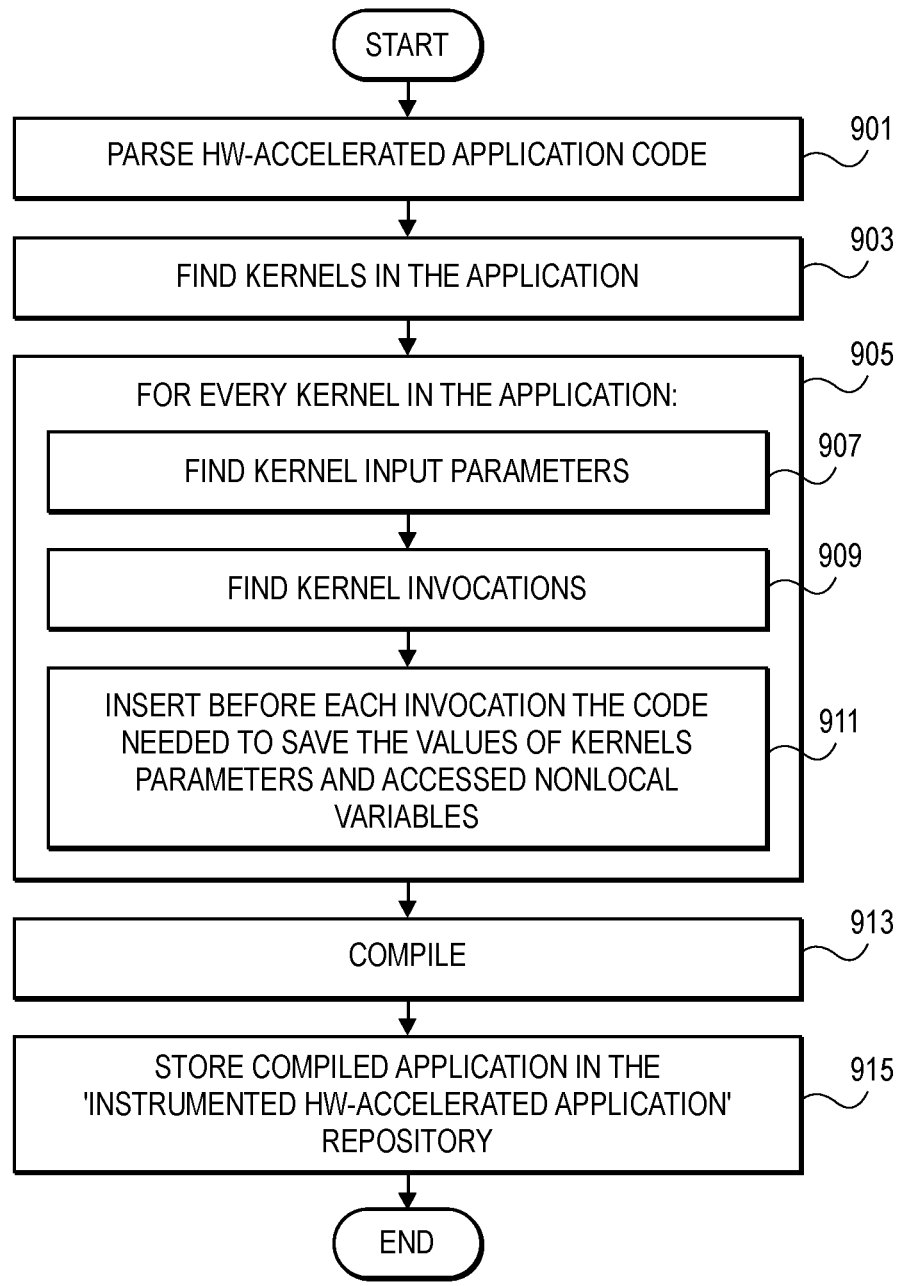
FIG. 9 is a flowchart of one embodiment of a process to modify the accelerated application on the source code level to capture the input data of the kernels.

FIG. 9 is a flowchart of one embodiment of a process to modify the accelerated application on the source code level to capture the input data of the kernels. The application source code is parsed (Block 901), and the available kernels are located (Block 903). For every kernel in the application (Block 905), the procedure finds the parameters of the kernel (Block 907). The procedure searches for the invocations of the kernel (Block 909) and inserts before each one of them the necessary code that can capture and save the values of parameters and the accessed variables (Block 911). The assessment application can then be compiled (Block 913) and stored in the instrumented hardware-accelerated application repository (Block 915). As this process shares multiple components with the source code level kernel extraction discussed earlier, the processes can be implemented as a single component.

Figure 10:
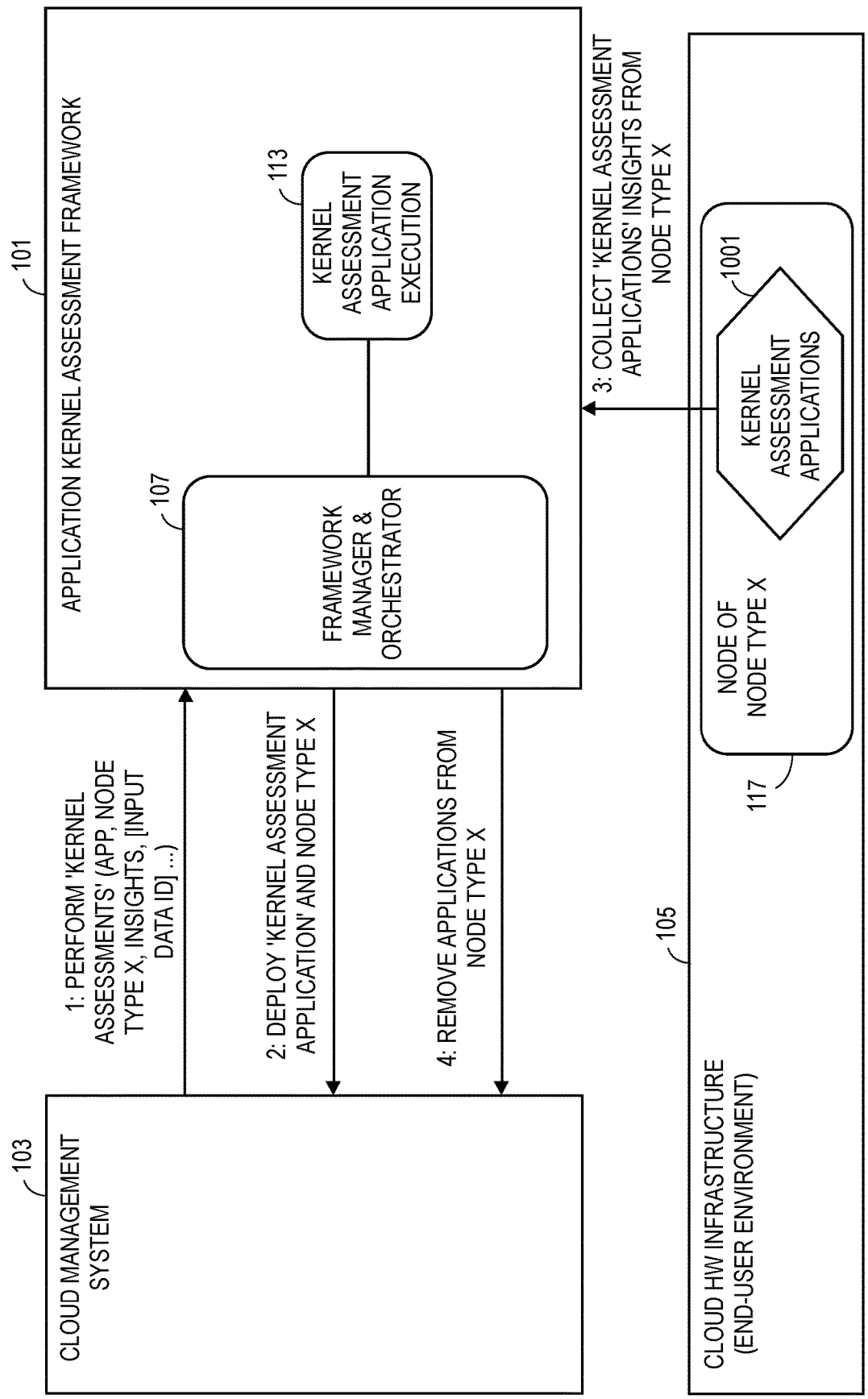
FIG. 10 is a diagram of one embodiment of the components of the kernel assessment application execution component.

FIG. 10 is a diagram of one embodiment of the components of the kernel assessment application execution component. Kernel assessment applications are created in the application kernel assessment framework 101. The kernel assessment application execution component 113 of the application kernel assessment framework 101 interacts with the cloud management system 103 via the orchestrator 107. The kernel insights collection is triggered by a request from the cloud management system 103 (at the example step 1). The cloud management system 103 orchestrates and configures hardware-accelerated applications. For this purpose, the cloud management system 103 utilizes insights about the kernels of the applications executed on the different node types in the system. If an insight is not available, the cloud management system 103 instructs the framework 101 to perform insights collection. This request identifies the application, one or more node types, and the insights to be collected. The request from the cloud management system 103 can also contain other fields such as identification for specific input data to be used (e.g., collected in a specific environment). At step 2, the cloud management system is requested to deploy the selected assessment applications on the requested one or more node types. The cloud management system 103 in turn deploys the kernel assessment applications 1001 to the cloud hardware infrastructure 105.

The deployed kernel assessment applications 1001 execute the kernels and collect insights with the profiler tools. The collected insights are reported to the framework 101 (at example step 3). Once the execution and the insights collection are completed, the cloud management system 103 is instructed to remove the kernel assessment applications 1001 from the cloud hardware infrastructure 105 (at example step 4).

Figure 11:
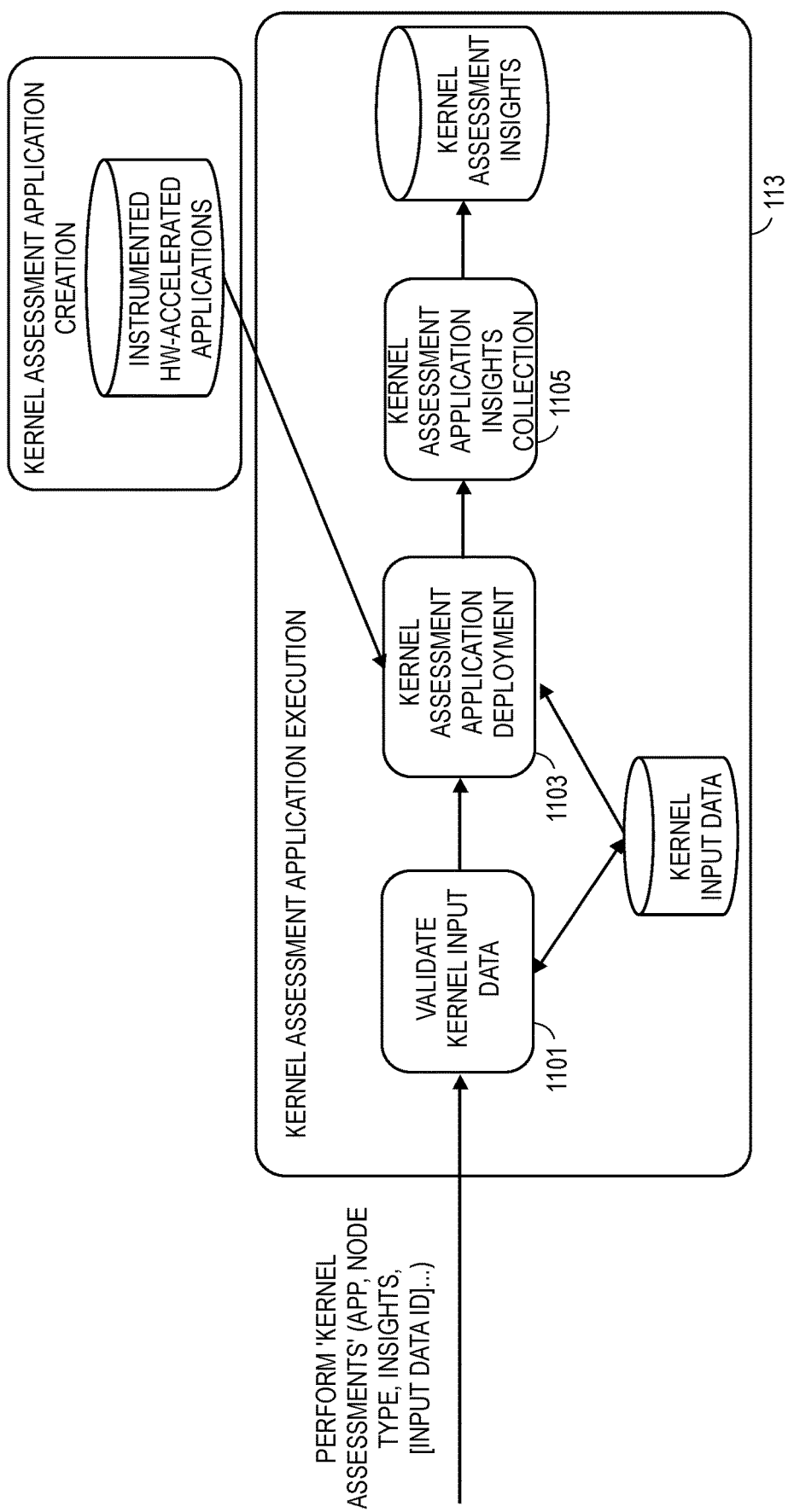
FIG. 11 is a diagram of one embodiment of the internal logical flow of the kernel assessment application execution component.

FIG. 11 is a diagram of one embodiment of the internal logical flow of the kernel assessment application execution component. A request from the cloud management system is first validated to determine if the available kernel input data can be used to fulfill the request (at Block 1101). Kernel input data might be extracted during the assessment application creation. Once kernel input data is available, kernel assessment applications are selected by the kernel assessment application deployment function 1103 to satisfy the collection requirements, specifically, which assessment applications to execute on what node types with what kernel input data. For example, if the request is (Application1, Node Type X, Execution Time), then this function 1103 will select assessment applications created for the kernels of Application1 for Node Type X that collect at least Execution Time as insight. The specific selected kernel input data is either provided as part of the deployment request (e.g., as a file or meta data made available on the node) or, it is made available to be dynamically loaded during the runtime of the kernel assessment applications (e.g., as a database that can be queried for input data). After the deployment 1103, the insights are collected (at Block 1105) and stored in the kernel assessment insights store. Kernel assessment applications can also report execution errors, that can be also recorded in this store.

Figure 12:
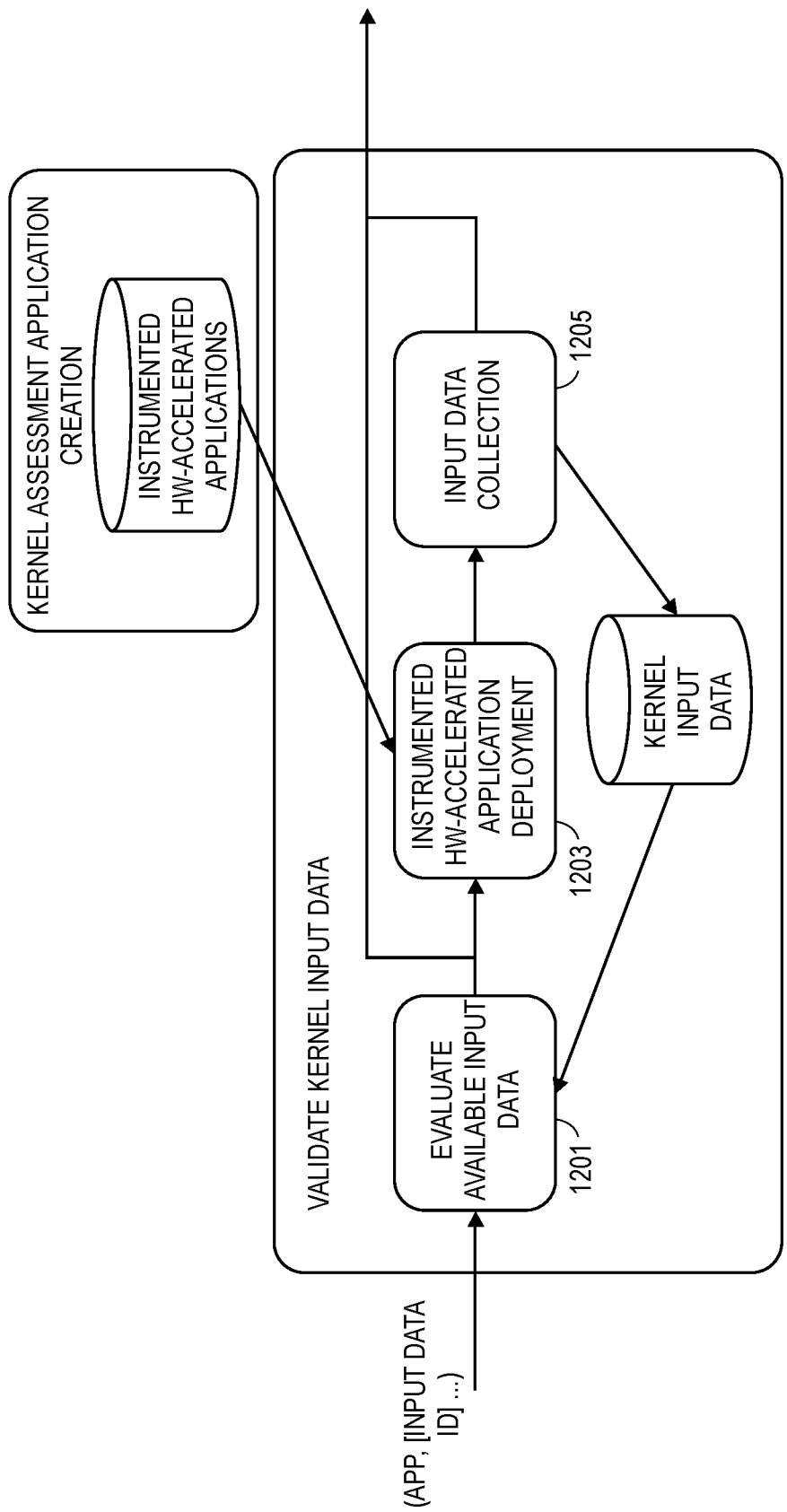
FIG. 12 is a diagram of one embodiment of the process of how the kernel input data is validated.

FIG. 12 is a diagram of one embodiment of the process of how the kernel input data is validated. If the available data is sufficient, the processing simply passes the validation. Otherwise, if the available kernel input data does not satisfy the requirements, the component might deploy the instrumented version of the identified hardware-accelerated application. This instrumented version is created during the assessment application creation step. The validation can evaluate available input data (at Block 1201), deploy instrumented accelerated applications (at Block 1203), and collect input data (at Block 1203).

Figure 13:
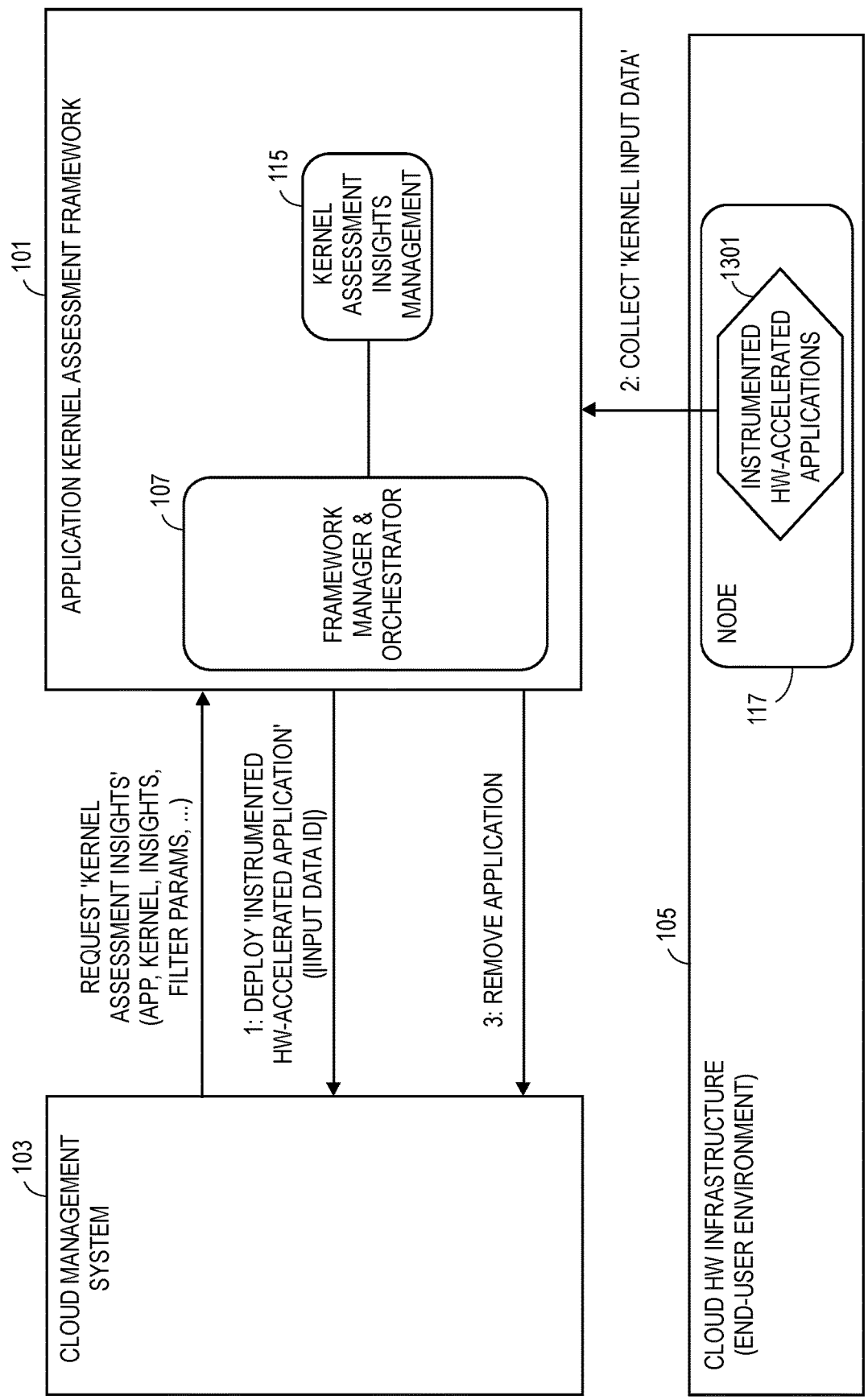
FIG. 13 is a diagram of one embodiment of the deployment of instrumented hardware accelerated applications.

FIG. 13 is a diagram of one embodiment of the deployment of instrumented hardware accelerated applications. The cloud management system 103 is instructed (at example step 1) to deploy the instrumented hardware-accelerated application. The instrumented accelerated application is deployed into an environment of an end-user. The specific end-user environment might be identified by the Input Data ID parameter. To collect kernel input data, the application needs to process real input data. The application can also be deployed in a test environment with pre-defined test or benchmarking workload. The collected kernel input data is reported to the framework 101 (at example step 2) and stored in the data store. The instrumented application is removed (at example step 3) via the cloud management system.

Figure 14:
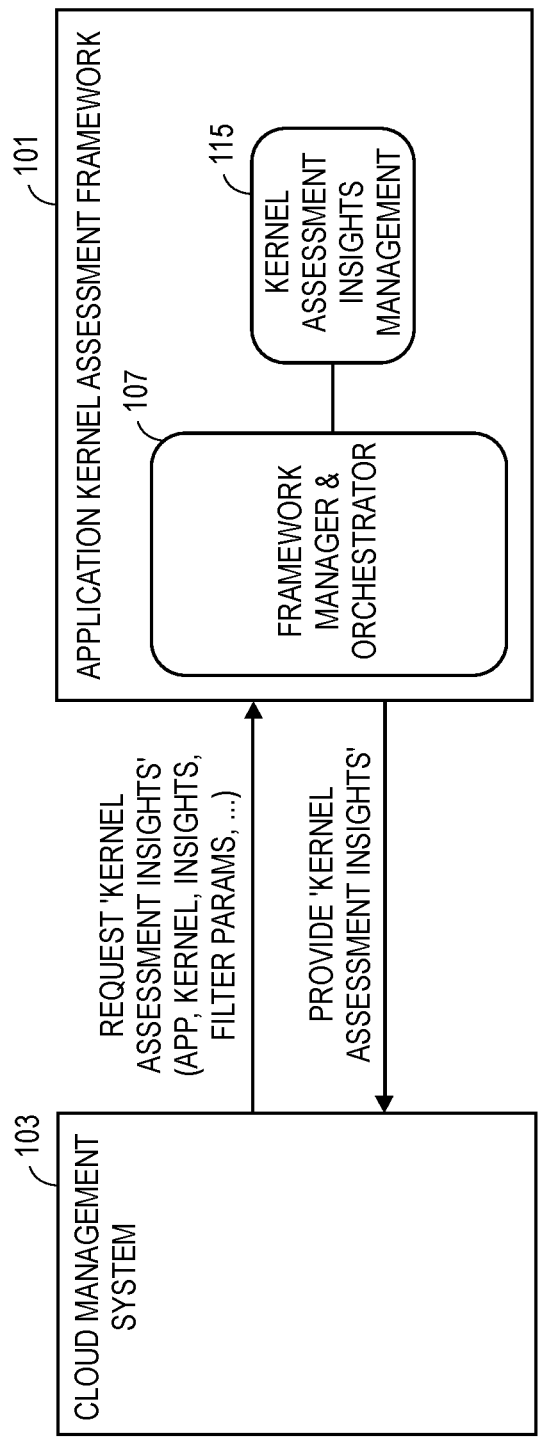
FIG. 14 is a diagram of one embodiment of the operation of the kernel assessment insights management.

FIG. 14 is a diagram of one embodiment of the operation of the kernel assessment insights management. The cloud management system requires complex policies and decisions that rely on accurate global state information, resource capabilities, and workload characteristics to better schedule hardware and software resources according to multi-objective optimization. In the context of hardware-accelerated applications, kernel insights provide useful characteristics about an application kernel, for example, related to performance, usage, energy consumption, and processing complexity, among others. These insights can be used by resource allocation algorithms to manage accelerators' assignment and to decide on which accelerator a kernel should be executed to fulfill the desired intent.

The required insights in a system will vary widely depending on the resource allocation algorithm used by the cloud management system 103. For instance, an algorithm that aims at minimizing the total execution time of an application requires insights on the execution time of every kernel in the application over the available accelerators on the compute node where the application is deployed. Another example is a multi-objective algorithm that tries to optimize both the execution time and energy consumption. This algorithm uses insights on both the execution time and consumed energy for the kernels over the available accelerators.

A cloud management platform 103 can communicate with the assessment framework 101 to access the collected kernel assessment insights. The interface between the cloud management system 103 and the framework 101 supports a request operation which performs insights retrieval. The cloud management system 103 can send the request to retrieve a certain set of insights in order to decide how to allocate the resources. The request will include the information of the application, the kernel of interest, and required insights (e.g., execution time). The request can also include other filtering parameters such as the node type where the insights have been collected, and date information, among others. These filters can be used to retrieve only the required insights and optimize the retrieval time and consumed bandwidth.

Figure 15:
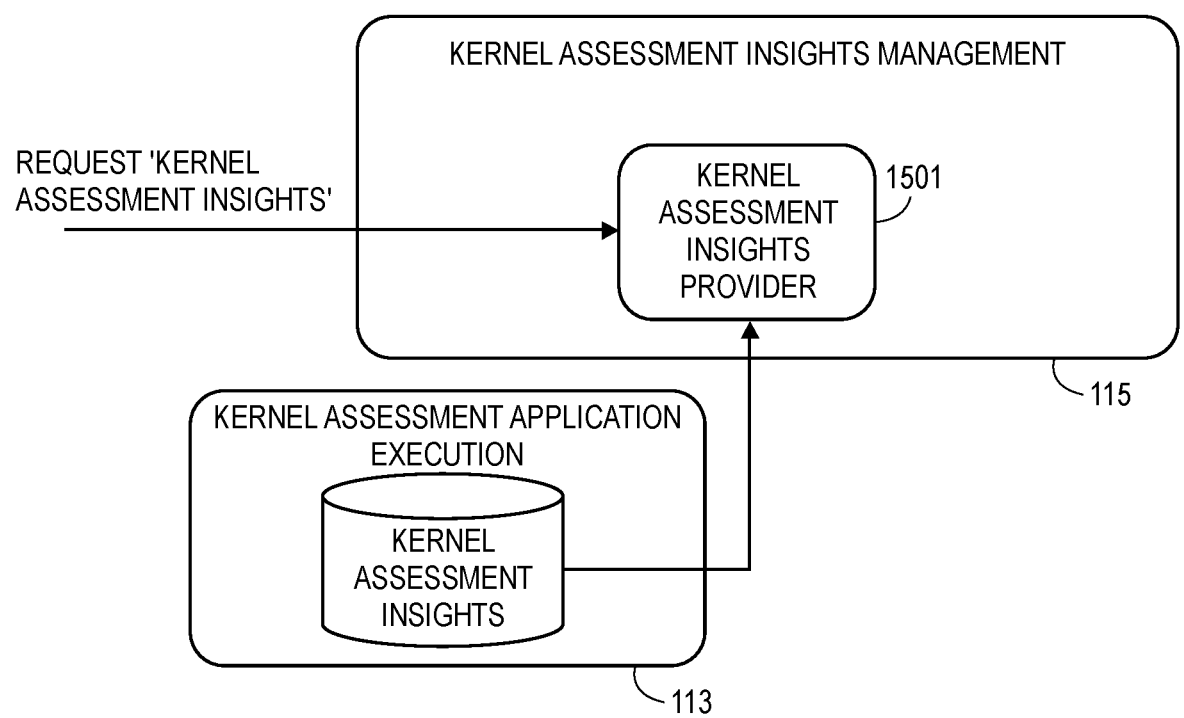
FIG. 15 is a diagram of one embodiment of a high-level internal architecture of the kernel assessment insights management component.

FIG. 15 is a diagram of one embodiment of a high-level internal architecture of the kernel assessment insights management component 115. One component is considered which is the kernel assessment insights provider 1501. The insights provider 1501 collects the requested insights from the kernel assessment insights repository and returns the results. The insights provider 1501 can also process the collected insights to create new insights based on collected ones. For instance, the insights provider 1501 can apply mathematical expression, such as percentile, on execution time to generate a new insight. More advanced operations can also be supported.

In one example embodiment, the cloud management system receives two hardware-accelerated applications to orchestrate with the goal that application 1 needs highest performance, while application 2 requires high energy efficiency. In this example, the applications have only 1 kernel and they are created with the OneAPI, enabling flexible acceleration with different devices. In this example, kernel input data is available. The cloud management system first requests the framework to discover the capabilities of the 2 Node Types in the system. Using the method described herein, the framework determines that the node types are the following Node Type 1: Intel CPU and integrated GPU, IaaS, Intel oneAPI support, and Node Type 2: AMD CPU and NVIDIA GPU, IaaS, Codeplay, and oneAPI support.

The cloud management system then requests the framework to create assessment applications with the following parameters: Application 1: assessment applications for both node type 1 and 2, with the target of high-performance insights; and Application 2: assessment applications for both node type 1 and 2, with the target of energy consumption insights.

The framework extracts the kernels from the applications, selects a reference skeleton for performance measurement for Application 1 and uses it to create an assessment application for node type 1, and another for node type 2 with NVIDIA performance optimizations enabled. For Application 2 it uses a different skeleton with the turbostat profiling tool to enable energy measurement and compiled again for both node types.

The cloud management system then instructs the framework to execute assessment applications for both applications. The framework issues 4 deployment requests to execute the created assessment applications on node types 1 and 2 and collects insights. The cloud management system queries collected insights related information from the framework. The insights show that: Application 1 performs significantly better on node type 2, thus the cloud management system uses a node type 2 node for this application; and Application 2 uses less energy on node type 1, thus the cloud management system uses a node type 1 node for this application.

In another example embodiment, a multi-kernel assessment is performed. Sharing accelerators among kernels of the same or different applications improves resource utilization and minimizes both the power consumption and operational costs. However, this can lead to performance interference and uncontrolled performance variations due to the competition for the same physical resources. The proposed assessment framework can help to find the combination of the kernels in which the performance of applications is minimally affected.

Nowadays, collecting insights from running applications with multiple kernels assigned to the same accelerator does not provide useful information since the cloud management system does not have control over the kernel scheduling and execution order. Thus, the collected insights cannot be used to find how the kernels impact the performance of each other. The proposed framework gives the cloud management system granular control over the kernels' scheduling and execution. The cloud management system can ask the framework to create an assessment application that runs multiple kernels, even from different applications, in parallel on the same accelerator. The assessment insights collected from running this application can be analyzed to determine if sharing the accelerator affected the performance of the kernels.

Figure 16:
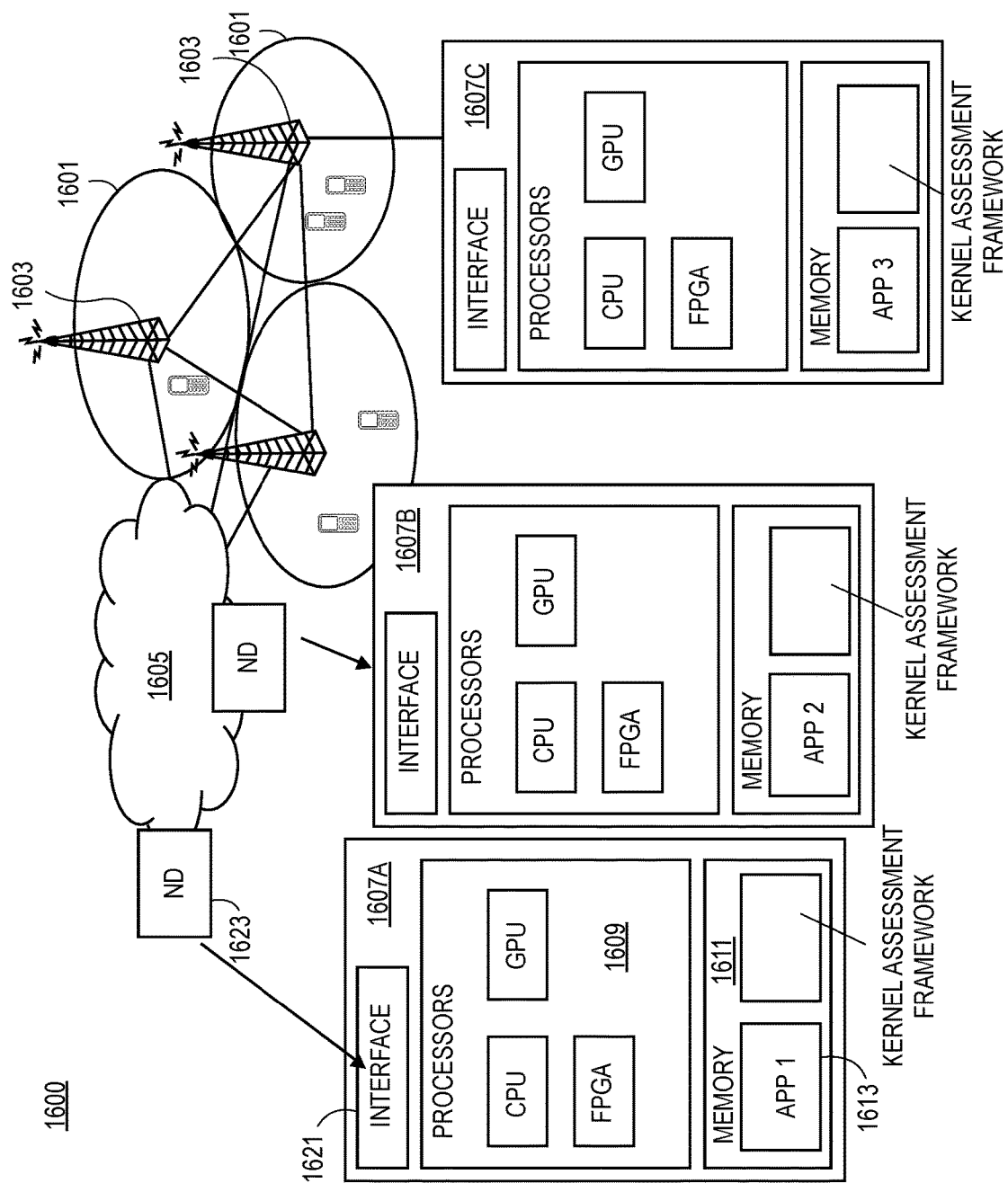
FIG. 16 is a diagram of one embodiment of a mobile communication network including resources that form an edge cloud system.

FIG. 16 is a diagram of one embodiment of a mobile communication network including resources that form an edge cloud system. The mobile communication network 1600 can include a core network 1605 and a set of radio access networks (RANs) 1607. The RANs 1607 consist of a set of base stations that provide connectivity to a set of user equipment (UEs) such as mobile devices (i.e., cellular phones). A base station 1603 can service and provide connectivity to any number of UEs. The base station 1603 can enable communication between UEs and other UEs or the core network 1605. Each base station 1603 can provide a set of compute resources 1607C. The compute resources can include a communication interface, processors including hardware accelerators (e.g., CPUs, GPUs, FPGAs, and similar accelerators) and similar components. The base station 1603 can also include storage including dynamic memory, static memory, long term storage media, and similar components. The base station memory can be a set of memory devices that form a larger memory and/or storage system. In some embodiments, the memory can be divided amongst the available processors with certain accelerators utilizing dedicated memory components and/or storage. The accelerated applications can be stored in and/or operate in these memory devices after deployment and during run time. Similarly, the components of the application kernel assessment framework can be stored in this memory.

The core network 1605 can also include computing nodes such as computing nodes 1607A-B that can form part of a centralized cloud system or an edge cloud system. These computing nodes 1607A-B can similarly include communication interfaces 1621, processors 1609, memory 1611, and similar components. The interface 1621 can be any type of networking interface for wired or wireless communication. Any number or variety of processors including CPUs, GPUs, FPGAs, and similar processing devices and accelerators can be included in the processors 1609. The computing nodes 1607A-B can also include memory/storage 1611 including dynamic memory, static memory, long term storage media, and similar components. The base station memory can be a set of memory devices that form a larger memory and/or storage system. In some embodiments, the memory 1611 can be divided amongst the available processors with certain accelerators utilizing dedicated memory components and/or storage. The accelerated applications 1613 can be stored in and/or operate in these memory devices after deployment and during run time. Similarly, the components of the application kernel assessment framework 1615 can be stored in this memory.

Figure 17:
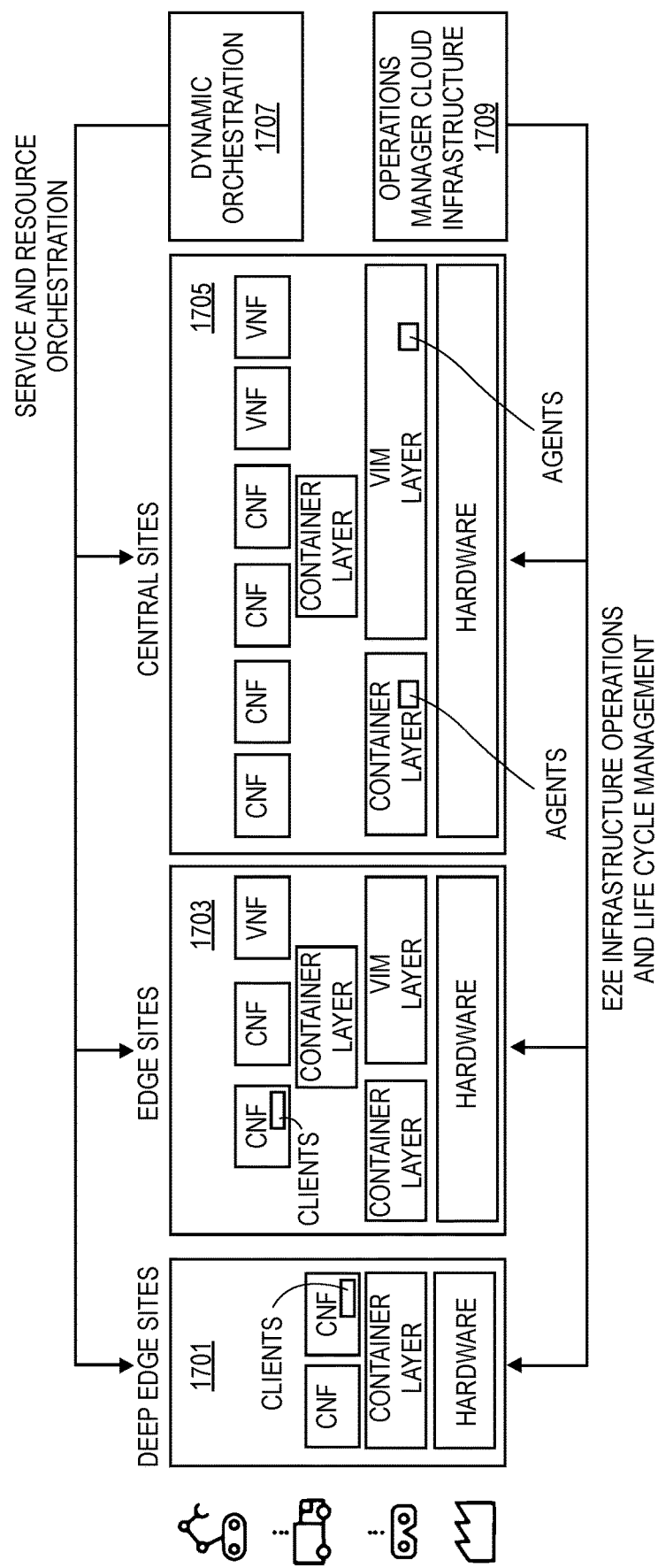
FIG. 17 is a diagram of one embodiment of a cloud system that includes edge cloud resources and centralized cloud resources.

FIG. 17 is a diagram of one embodiment of a cloud system that includes edge cloud resources and centralized cloud resources. In this embodiment, the application kernel assessment framework is implemented in a distributed cloud system than includes edge cloud sites 1701, 1703 (e.g., a deep edge site 1701 and standard edge site 1703), central cloud site 1705 and management components 1707, 1709. Deep edge sites 1701 are further removed and have fewer resources than an edge site 1703.

The deep edge sites 1701 are positioned closest to UEs and include a hardware layer with any number of general-purpose processors and accelerators. A container layer such as Docker, Kubernetes, or similar system can execute over the hardware layer to support application execute where the support any number of applications or functions running in containers. The applications and functions can be executed as cloud-native network functions (CNFs), virtualized network functions (VNFs), or similar containerized functions.

The edge sites 1703 are positioned close to UEs and include a hardware layer with any number of general-purpose processors and accelerators. A container layer such as Docker, Kubernetes, or similar system can execute over the hardware layer to support application execute where the support any number of applications or functions running in containers. A virtualized infrastructure manager (VIM) is present to support VNFs. In some embodiments, a container layer can run over the VIM layer. The applications and functions can be executed as CNFs, VNFs, or similar containerized functions.

The centralized sites 1705 are positioned close to the core of a mobile communication network and include a hardware layer with any number of general-purpose processors and accelerators. A container layer such as Docker, Kubernetes, or similar system can execute over the hardware layer to support application execute where the support any number of applications or functions running in containers. A virtualized infrastructure manager (VIM) is present to support VNFs. In some embodiments, a container layer can run over the VIM layer. The applications and functions can be executed as CNFs, VNFs, or similar containerized functions.

The dynamic orchestration component 1707 can manage the deployment and handling of the CNF, VNF, and similar containerized functions. The operation manager cloud infrastructure 1709 can manage the hardware, container layer, VIM, and related aspects of the cloud system.

Figure 18A:
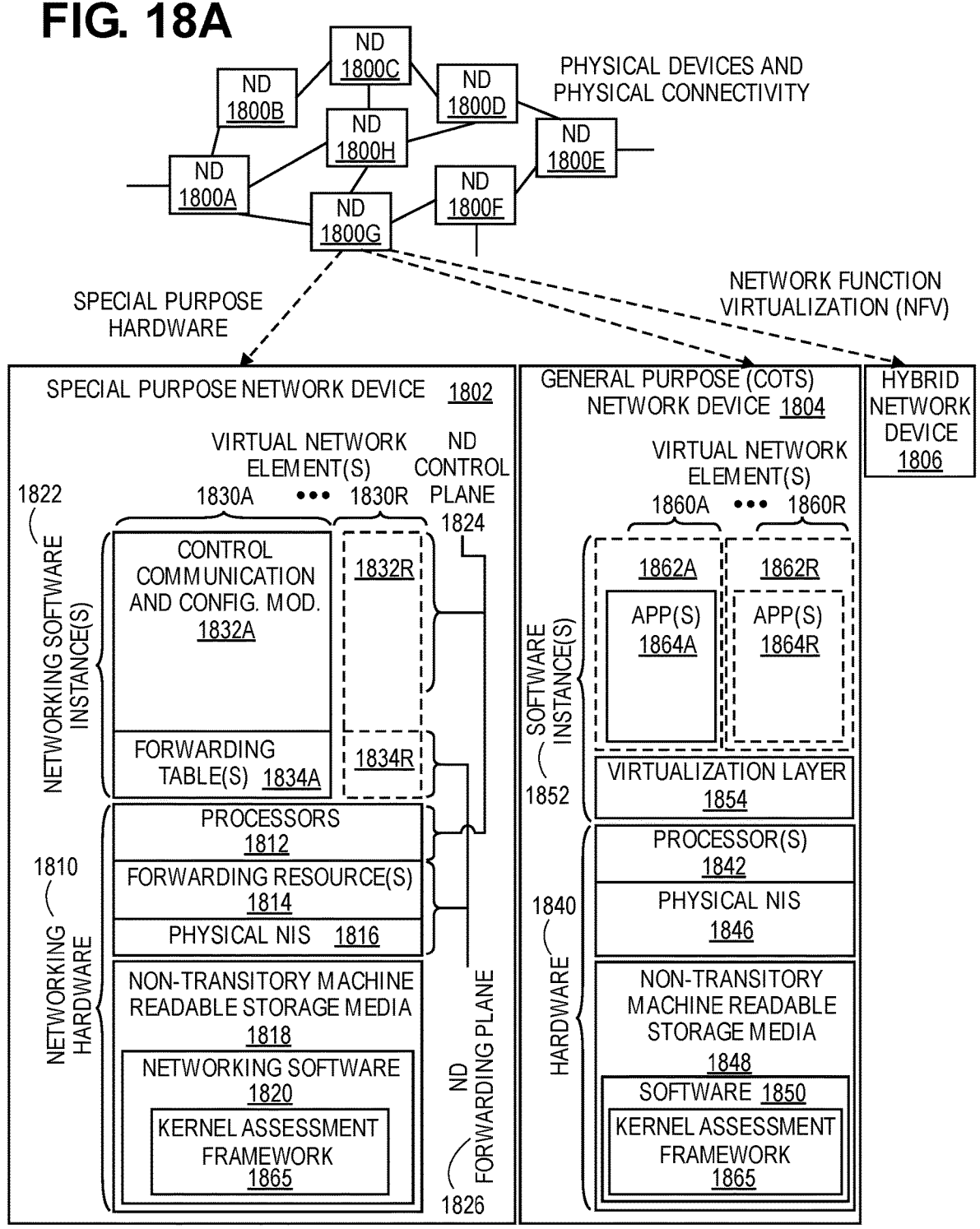
FIG. 18A illustrates connectivity between network devices (NDs) within an exemplary network, as well as three exemplary implementations of the NDs, according to some embodiments of the invention.

FIG. 18A illustrates connectivity between network devices (NDs) within an exemplary network, as well as three exemplary implementations of the NDs, according to some embodiments. FIG. 18A shows NDs 1800A-H, and their connectivity by way of lines between 1800A-1800B, 1800B-1800C, 1800C-1800D, 1800D-1800E, 1800E-1800F, 1800F-1800G, and 1800A-1800G, as well as between 1800H and each of 1800A, 1800C, 1800D, and 1800G. These NDs are physical devices, and the connectivity between these NDs can be wireless or wired (often referred to as a link). An additional line extending from NDs 1800A, 1800E, and 1800F illustrates that these NDs act as ingress and egress points for the network (and thus, these NDs are sometimes referred to as edge NDs; while the other NDs may be called core NDs).

Two of the exemplary ND implementations in FIG. 18A are: 1) a special-purpose network device 1802 that uses custom application-specific integrated circuits (ASICs) and a special-purpose operating system (OS); and 2) a general purpose network device 1804 that uses common off-the-shelf (COTS) processors and a standard OS.

The special-purpose network device 1802 includes networking hardware 1810 comprising a set of one or more processor(s) 1812, forwarding resource(s) 1814 (which typically include one or more ASICs and/or network processors), and physical network interfaces (NIs) 1816 (through which network connections are made, such as those shown by the connectivity between NDs 1800A-H), as well as non-transitory machine readable storage media 1818 having stored therein networking software 1820. During operation, the networking software 1820 may be executed by the networking hardware 1810 to instantiate a set of one or more networking software instance(s) 1822. Each of the networking software instance(s) 1822, and that part of the networking hardware 1810 that executes that network software instance (be it hardware dedicated to that networking software instance and/or time slices of hardware temporally shared by that networking software instance with others of the networking software instance(s) 1822), form a separate virtual network element 1830A-R. Each of the virtual network element(s) (VNEs) 1830A-R includes a control communication and configuration module 1832A-R (sometimes referred to as a local control module or control communication module) and forwarding table(s) 1834A-R, such that a given virtual network element (e.g., 1830A) includes the control communication and configuration module (e.g., 1832A), a set of one or more forwarding table(s) (e.g., 1834A), and that portion of the networking hardware 1810 that executes the virtual network element (e.g., 1830A).

The networking software 1820 can include the application kernel assessment framework 1865 depending on the configuration and operation of the special-purpose network device 1802 in the overall network. The networking software 1820 can also include the application kernel assessment framework and related components 1865.

The special-purpose network device 1802 is often physically and/or logically considered to include: 1) a ND control plane 1824 (sometimes referred to as a control plane) comprising the processor(s) 1812 that execute the control communication and configuration module(s) 1832A-R; and 2) a ND forwarding plane 1826 (sometimes referred to as a forwarding plane, a data plane, or a media plane) comprising the forwarding resource(s) 1814 that utilize the forwarding table(s) 1834A-R and the physical NIs 1816. By way of example, where the ND is a router (or is implementing routing functionality), the ND control plane 1824 (the processor(s) 1812 executing the control communication and configuration module(s) 1832A-R) is typically responsible for participating in controlling how data (e.g., packets) is to be routed (e.g., the next hop for the data and the outgoing physical NI for that data) and storing that routing information in the forwarding table(s) 1834A-R, and the ND forwarding plane 1826 is responsible for receiving that data on the physical NIs 1816 and forwarding that data out the appropriate ones of the physical NIs 1816 based on the forwarding table(s) 1834A-R.

Figure 18B:
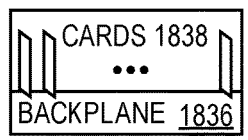
FIG. 18B illustrates an exemplary way to implement a special-purpose network device according to some embodiments of the invention.

FIG. 18B illustrates an exemplary way to implement the special-purpose network device 1802 according to some embodiments. FIG. 18B shows a special-purpose network device including cards 1838 (typically hot pluggable). While in some embodiments the cards 1838 are of two types (one or more that operate as the ND forwarding plane 1826 (sometimes called line cards), and one or more that operate to implement the ND control plane 1824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1836 (e.g., a first full mesh coupling the line cards and a second full mesh coupling all of the cards).

Returning to FIG. 18A, the general purpose network device 1804 includes hardware 1840 comprising a set of one or more processor(s) 1842 (which are often COTS processors) and physical NIs 1846, as well as non-transitory machine readable storage media 1848 having stored therein software 1850. During operation, the processor(s) 1842 execute the software 1850 to instantiate one or more sets of one or more applications 1864A-R. While one embodiment does not implement virtualization, alternative embodiments may use different forms of virtualization. For example, in one such alternative embodiment the virtualization layer 1854 represents the kernel of an operating system (or a shim executing on a base operating system) that allows for the creation of multiple instances 1862A-R called software containers that may each be used to execute one (or more) of the sets of applications 1864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1854 represents a hypervisor (sometimes referred to as a virtual machine monitor (VMM)) or a hypervisor executing on top of a host operating system, and each of the sets of applications 1864A-R is run on top of a guest operating system within an instance 1862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1840, directly on a hypervisor (in which case the unikernel is sometimes described as running within a LibOS virtual machine), or in a software container, embodiments can be implemented fully with unikernels running directly on a hypervisor represented by virtualization layer 1854, unikernels running within software containers represented by instances 1862A-R, or as a combination of unikernels and the above-described techniques (e.g., unikernels and virtual machines both run directly on a hypervisor, unikernels and sets of applications that are run in different software containers).

The software 1850 can include the application kernel assessment framework 1865 depending on the configuration and operation of the general purpose network device 1804 in the overall network. The software 1850 can also include the application kernel assessment framework, and related components 1865.

The instantiation of the one or more sets of one or more applications 1864A-R, as well as virtualization if implemented, are collectively referred to as software instance(s) 1852. Each set of applications 1864A-R, corresponding virtualization construct (e.g., instance 1862A-R) if implemented, and that part of the hardware 1840 that executes them (be it hardware dedicated to that execution and/or time slices of hardware temporally shared), forms a separate virtual network element(s) 1860A-R.

The virtual network element(s) 1860A-R perform similar functionality to the virtual network element(s) 1830A-R—e.g., similar to the control communication and configuration module(s) 1832A and forwarding table(s) 1834A (this virtualization of the hardware 1840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 1862A-R corresponding to one VNE 1860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1862A-R to VNEs also apply to embodiments where such a finer level of granularity and/or unikernels are used.

In certain embodiments, the virtualization layer 1854 includes a virtual switch that provides similar forwarding services as a physical Ethernet switch. Specifically, this virtual switch forwards traffic between instances 1862A-R and the physical NI(s) 1846, as well as optionally between the instances 1862A-R; in addition, this virtual switch may enforce network isolation between the VNEs 1860A-R that by policy are not permitted to communicate with each other (e.g., by honoring virtual local area networks (VLANs)).

The third exemplary ND implementation in FIG. 18A is a hybrid network device 1806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1802) could provide for para-virtualization to the networking hardware present in the hybrid network device 1806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1830A-R, VNEs 1860A-R, and those in the hybrid network device 1806) receives data on the physical NIs (e.g., 1816, 1846) and forwards that data out the appropriate ones of the physical NIs (e.g., 1816, 1846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 18C:
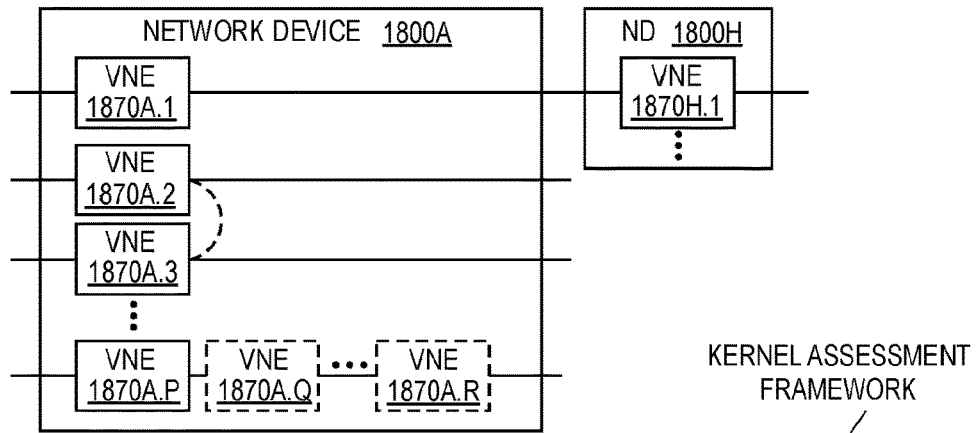
FIG. 18C illustrates various exemplary ways in which virtual network elements (VNEs) may be coupled according to some embodiments of the invention.

FIG. 18C illustrates various exemplary ways in which VNEs may be coupled according to some embodiments. FIG. 18C shows VNEs 1870A.1-1870A.P (and optionally VNEs 1870A.Q-1870A.R) implemented in ND 1800A and VNE 1870H.1 in ND 1800H. In FIG. 18C, VNEs 1870A.1-P are separate from each other in the sense that they can receive packets from outside ND 1800A and forward packets outside of ND 1800A; VNE 1870A.1 is coupled with VNE 1870H.1, and thus they communicate packets between their respective NDs; VNE 1870A.2-1870A.3 may optionally forward packets between themselves without forwarding them outside of the ND 1800A; and VNE 1870A.P may optionally be the first in a chain of VNEs that includes VNE 1870A.Q followed by VNE 1870A.R (this is sometimes referred to as dynamic service chaining, where each of the VNEs in the series of VNEs provides a different service—e.g., one or more layer 4-7 network services). While FIG. 18C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 18A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 18A may also host one or more such servers (e.g., in the case of the general purpose network device 1804, one or more of the software instances 1862A-R may operate as servers; the same would be true for the hybrid network device 1806; in the case of the special-purpose network device 1802, one or more such servers could also be run on a virtualization layer executed by the processor(s) 1812); in which case the servers are said to be co-located with the VNEs of that ND.

A virtual network is a logical abstraction of a physical network (such as that in FIG. 18A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 18D:
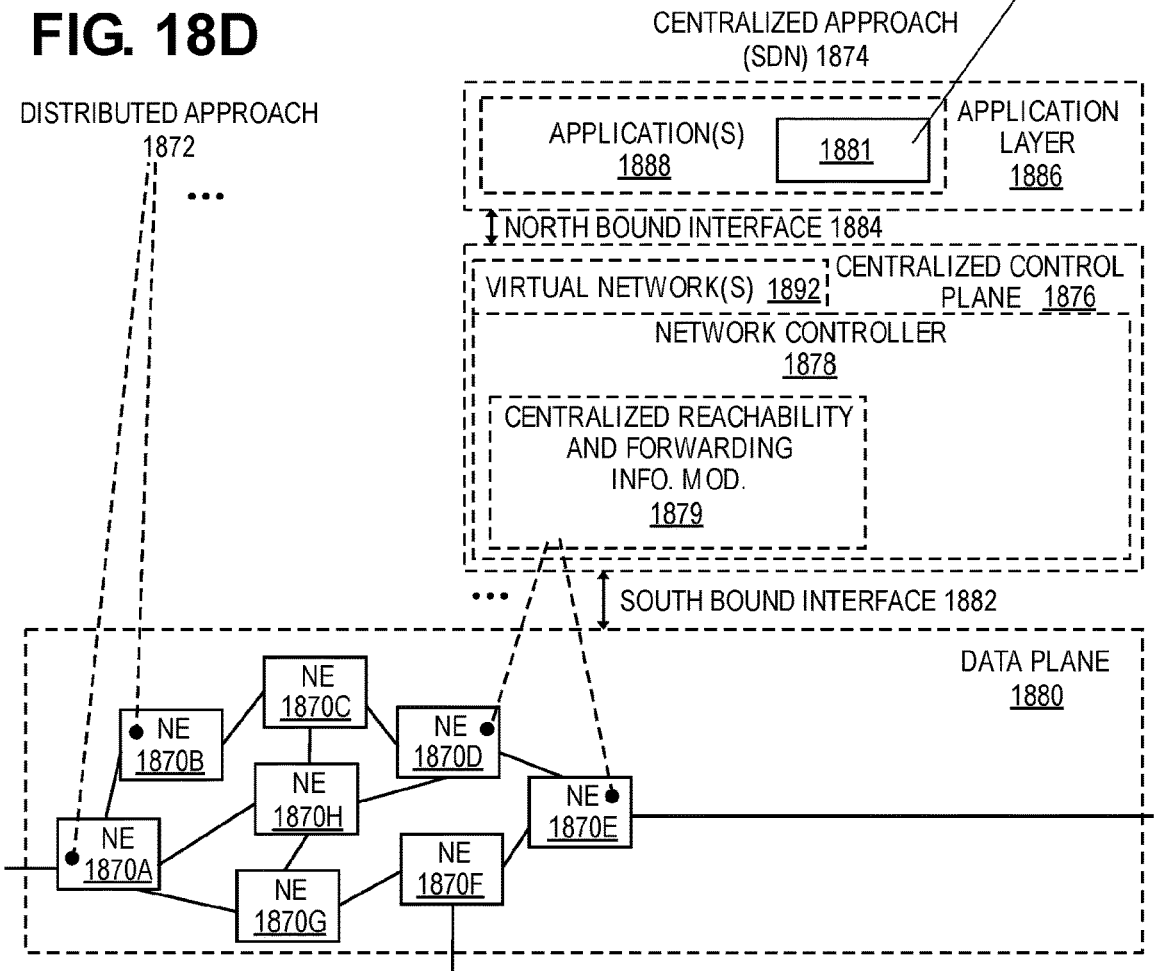
FIG. 18D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 18D illustrates a network with a single network element on each of the NDs of FIG. 18A, and within this straightforward approach contrasts a traditional distributed approach (commonly used by traditional routers) with a centralized approach for maintaining reachability and forwarding information (also called network control), according to some embodiments. Specifically, FIG. 18D illustrates network elements (NEs) 1870A-H with the same connectivity as the NDs 1800A-H of FIG. 18A.

FIG. 18D illustrates that the distributed approach 1872 distributes responsibility for generating the reachability and forwarding information across the NEs 1870A-H; in other words, the process of neighbor discovery and topology discovery is distributed.

For example, where the special-purpose network device 1802 is used, the control communication and configuration module(s) 1832A-R of the ND control plane 1824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1870A-H (e.g., the processor(s) 1812 executing the control communication and configuration module(s) 1832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1824. The ND control plane 1824 programs the ND forwarding plane 1826 with information (e.g., adjacency and route information) based on the routing structure(s). For example, the ND control plane 1824 programs the adjacency and route information into one or more forwarding table(s) 1834A-R (e.g., Forwarding Information Base (FIB), Label Forwarding Information Base (LFIB), and one or more adjacency structures) on the ND forwarding plane 1826. For layer 2 forwarding, the ND can store one or more bridging tables that are used to forward data based on the layer 2 information in that data. While the above example uses the special-purpose network device 1802, the same distributed approach 1872 can be implemented on the general purpose network device 1804 and the hybrid network device 1806.

FIG. 18D illustrates that a centralized approach 1874 (also known as software defined networking (SDN)) that decouples the system that makes decisions about where traffic is sent from the underlying systems that forwards traffic to the selected destination. The illustrated centralized approach 1874 has the responsibility for the generation of reachability and forwarding information in a centralized control plane 1876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1876 has a south bound interface 1882 with a data plane 1880 (sometime referred to the infrastructure layer, network forwarding plane, or forwarding plane (which should not be confused with a ND forwarding plane)) that includes the NEs 1870A-H (sometimes referred to as switches, forwarding elements, data plane elements, or nodes). The centralized control plane 1876 includes a network controller 1878, which includes a centralized reachability and forwarding information module 1879 that determines the reachability within the network and distributes the forwarding information to the NEs 1870A-H of the data plane 1880 over the south bound interface 1882 (which may use the OpenFlow protocol). Thus, the network intelligence is centralized in the centralized control plane 1876 executing on electronic devices that are typically separate from the NDs.

For example, where the special-purpose network device 1802 is used in the data plane 1880, each of the control communication and configuration module(s) 1832A-R of the ND control plane 1824 typically include a control agent that provides the VNE side of the south bound interface 1882. In this case, the ND control plane 1824 (the processor (s) 1812 executing the control communication and configuration module(s) 1832A-R) performs its responsibility for participating in controlling how data (e.g., packets) is to be routed (e.g., the next hop for the data and the outgoing physical NI for that data) through the control agent communicating with the centralized control plane 1876 to receive the forwarding information (and in some cases, the reachability information) from the centralized reachability and forwarding information module 1879 (it should be understood that in some embodiments, the control communication and configuration module(s) 1832A-R, in addition to communicating with the centralized control plane 1876, may also play some role in determining reachability and/or calculating forwarding information-albeit less so than in the case of a distributed approach; such embodiments are generally considered to fall under the centralized approach 1874, but may also be considered a hybrid approach).

While the above example uses the special-purpose network device 1802, the same centralized approach 1874 can be implemented with the general purpose network device 1804 (e.g., each of the VNE 1860A-R performs its responsibility for controlling how data (e.g., packets) is to be routed (e.g., the next hop for the data and the outgoing physical NI for that data) by communicating with the centralized control plane 1876 to receive the forwarding information (and in some cases, the reachability information) from the centralized reachability and forwarding information module 1879; it should be understood that in some embodiments, the VNEs 1860A-R, in addition to communicating with the centralized control plane 1876, may also play some role in determining reachability and/or calculating forwarding information-albeit less so than in the case of a distributed approach) and the hybrid network device 1806. In fact, the use of SDN techniques can enhance the NFV techniques typically used in the general purpose network device 1804 or hybrid network device 1806 implementations as NFV is able to support SDN by providing an infrastructure upon which the SDN software can be run, and NFV and SDN both aim to make use of commodity server hardware and physical switches.

FIG. 18D also shows that the centralized control plane 1876 has a north bound interface 1884 to an application layer 1886, in which resides application(s) 1888. The centralized control plane 1876 has the ability to form virtual networks 1892 (sometimes referred to as a logical forwarding plane, network services, or overlay networks (with the NEs 1870A-H of the data plane 1880 being the underlay network)) for the application(s) 1888. Thus, the centralized control plane 1876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The application layer 1886 can include the application kernel assessment framework 1881 depending on the configuration and operation of the centralized approach 1874. The application layer 1886 can also include the application kernel assessment framework, and related components 1881.

While FIG. 18D shows the distributed approach 1872 separate from the centralized approach 1874, the effort of network control may be distributed differently or the two combined in certain embodiments. For example: 1) embodiments may generally use the centralized approach (SDN) 1874, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 1874 but may also be considered a hybrid approach.

While FIG. 18D illustrates the simple case where each of the NDs 1800A-H implements a single NE 1870A-H, it should be understood that the network control approaches described with reference to FIG. 18D also work for networks where one or more of the NDs 1800A-H implement multiple VNEs (e.g., VNEs 1830A-R, VNEs 1860A-R, those in the hybrid network device 1806). Alternatively, or in addition, the network controller 1878 may also emulate the implementation of multiple VNEs in a single ND. Specifically, instead of (or in addition to) implementing multiple VNEs in a single ND, the network controller 1878 may present the implementation of a VNE/NE in a single ND as multiple VNEs in the virtual networks 1892 (all in the same one of the virtual network(s) 1892, each in different ones of the virtual network(s) 1892, or some combination). For example, the network controller 1878 may cause an ND to implement a single VNE (a NE) in the underlay network, and then logically divide up the resources of that NE within the centralized control plane 1876 to present different VNEs in the virtual network(s) 1892 (where these different VNEs in the overlay networks are sharing the resources of the single VNE/NE implementation on the ND in the underlay network).

Figure 18E:
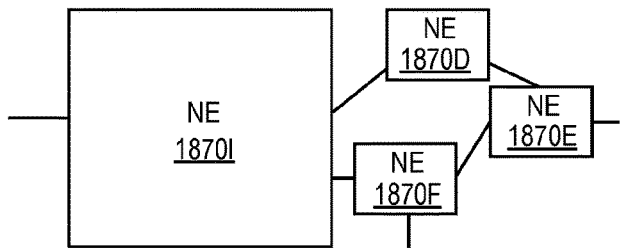
FIG. 18E illustrates the simple case of where each of the NDs implements a single NE, but a centralized control plane has abstracted multiple of the NEs in different NDs into (to represent) a single NE in one of the virtual network(s), according to some embodiments of the invention.
Figure 18F:
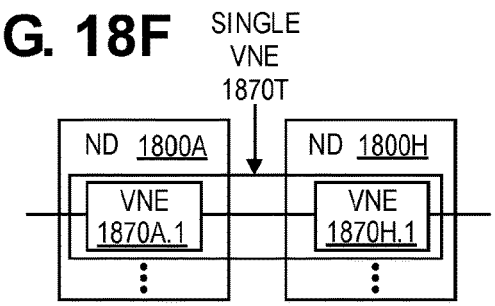
FIG. 18F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 18E and 18F respectively illustrate exemplary abstractions of NEs and VNEs that the network controller 1878 may present as part of different ones of the virtual networks 1892. FIG. 18E illustrates the simple case of where each of the NDs 1800A-H implements a single NE 1870A-H (see FIG. 18D), but the centralized control plane 1876 has abstracted multiple of the NEs in different NDs (the NEs 1870A-C and G-H) into (to represent) a single NE 1870I in one of the virtual network(s) 1892 of FIG. 18D, according to some embodiments. FIG. 18E shows that in this virtual network, the NE 1870I is coupled to NE 1870D and 1870F, which are both still coupled to NE 1870E.

FIG. 18F illustrates a case where multiple VNEs (VNE 1870A.1 and VNE 1870H.1) are implemented on different NDs (ND 1800A and ND 1800H) and are coupled to each other, and where the centralized control plane 1876 has abstracted these multiple VNEs such that they appear as a single VNE 1870T within one of the virtual networks 1892 of FIG. 18D, according to some embodiments. Thus, the abstraction of a NE or VNE can span multiple NDs.

While some embodiments implement the centralized control plane 1876 as a single entity (e.g., a single instance of software running on a single electronic device), alternative embodiments may spread the functionality across multiple entities for redundancy and/or scalability purposes (e.g., multiple instances of software running on different electronic devices).

Figure 19:
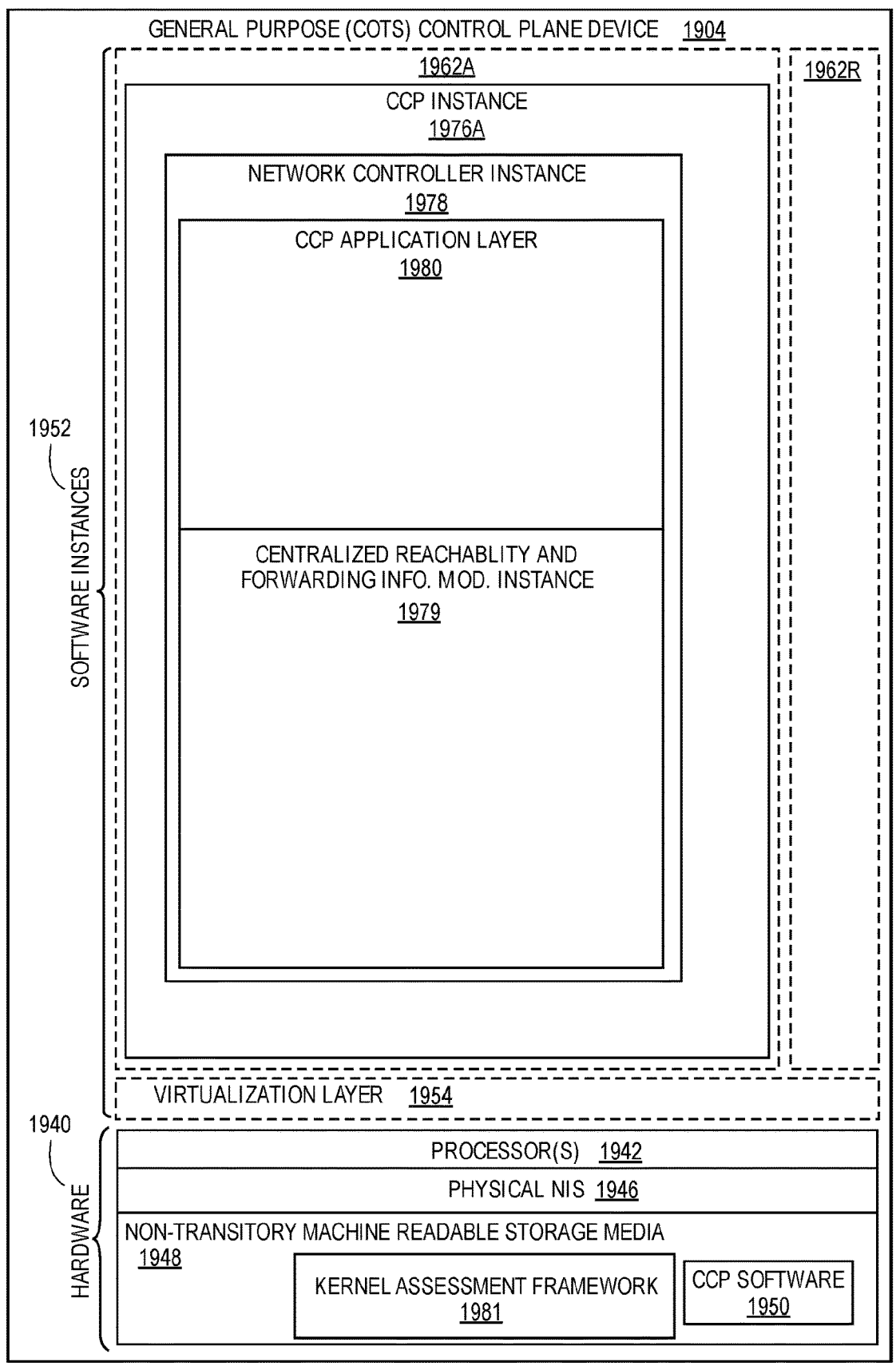
FIG. 19 illustrates a general purpose control plane device with centralized control plane (CCP) software 1950), according to some embodiments of the invention.

Similar to the network device implementations, the electronic device(s) running the centralized control plane 1876, and thus the network controller 1878 including the centralized reachability and forwarding information module 1879, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 19 illustrates, a general purpose control plane device 1904 including hardware 1940 comprising a set of one or more processor(s) 1942 (which are often COTS processors) and physical NIs 1946, as well as non-transitory machine readable storage media 1948 having stored therein centralized control plane (CCP) software 1950.

The non-transitory machine readable storage medium 1948 can include the application kernel assessment framework 1981 depending on the configuration and operation of the general purpose control plane device 1904 in the overall network. The storage medium 1948 can also include the application kernel assessment framework, and related components 1981.

In embodiments that use compute virtualization, the processor(s) 1942 typically execute software to instantiate a virtualization layer 1954 (e.g., in one embodiment the virtualization layer 1954 represents the kernel of an operating system (or a shim executing on a base operating system) that allows for the creation of multiple instances 1962A-R called software containers (representing separate user spaces and also called virtualization engines, virtual private servers, or jails) that may each be used to execute a set of one or more applications; in another embodiment the virtualization layer 1954 represents a hypervisor (sometimes referred to as a virtual machine monitor (VMM)) or a hypervisor executing on top of a host operating system, and an application is run on top of a guest operating system within an instance 1962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1940, directly on a hypervisor represented by virtualization layer 1954 (in which case the unikernel is sometimes described as running within a LibOS virtual machine), or in a software container represented by one of instances 1962A-R). Again, in embodiments where compute virtualization is used, during operation an instance of the CCP software 1950 (illustrated as CCP instance 1976A) is executed (e.g., within the instance 1962A) on the virtualization layer 1954. In embodiments where compute virtualization is not used, the CCP instance 1976A is executed, as a unikernel or on top of a host operating system, on the "bare metal" general purpose control plane device 1904. The instantiation of the CCP instance 1976A, as well as the virtualization layer 1954 and instances 1962A-R if implemented, are collectively referred to as software instance(s) 1952.

In some embodiments, the CCP instance 1976A includes a network controller instance 1978. The network controller instance 1978 includes a centralized reachability and forwarding information module instance 1979 (which is a middleware layer providing the context of the network controller 1878 to the operating system and communicating with the various NEs), and an CCP application layer 1980 (sometimes referred to as an application layer) over the middleware layer (providing the intelligence required for various network operations such as protocols, network situational awareness, and user-interfaces). At a more abstract level, this CCP application layer 1980 within the centralized control plane 1876 works with virtual network view(s) (logical view(s) of the network) and the middleware layer provides the conversion from the virtual networks to the physical view.

The centralized control plane 1876 transmits relevant messages to the data plane 1880 based on CCP application layer 1980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1880 may receive different messages, and thus different forwarding information. The data plane 1880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPV4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1880, the packet (or a subset of the packet header and content) is typically forwarded to the centralized control plane 1876. The centralized control plane 1876 will then program forwarding table entries into the data plane 1880 to accommodate packets belonging to the flow of the unknown packet. Once a specific forwarding table entry has been programmed into the data plane 1880 by the centralized control plane 1876, the next packet with matching credentials will match that forwarding table entry and take the set of actions associated with that matched entry.

While the application kernel assessment framework has been described in terms of several embodiments, those skilled in the art will recognize that the application kernel assessment framework is not limited to the embodiments described, can be practiced with modification and alteration within the spirit and scope of the appended claims. The description is thus to be regarded as illustrative instead of limiting.

What is claimed is:

1. A method of assessment of applications in a cloud infrastructure, the method comprising:
generating a kernel assessment application to analyze an application to be executed on the cloud infrastructure, wherein generating the kernel assessment application comprises:
parsing hardware accelerated application code in the application;
identifying a kernel in the hardware accelerated application code, wherein the kernel is a highly parallel computing task of the hardware accelerated application code; and
extracting kernel information including kernel logic, input data, data types, and dependencies for the kernel;
deploying the kernel assessment application in the cloud infrastructure;
executing the kernel assessment application in the cloud infrastructure, thereby executing the kernel;
collecting kernel insights, while executing the kernel, for at least deciding, based on collected kernel insights, on which accelerator the kernel should be executed; and
storing the kernel insights collected from the kernel assessment application to be utilized for executing the application in the cloud infrastructure.

2. The method of claim 1 further comprising:
discovering capabilities of the cloud infrastructure, wherein the collected kernel insights are correlated with the capabilities of the cloud infrastructure.

3. The method of claim 2, wherein the capabilities of the cloud infrastructure include identifying a plurality of accelerators in the cloud infrastructure.

4. The method of claim 2, wherein discovering the capabilities of the cloud infrastructure comprising:
deploying a node capabilities discovery application to collect hardware and software capabilities to each compute node in the cloud infrastructure.

5. The method of claim 1, wherein generating the kernel assessment application further comprising:
storing extracted kernel information in an extracted kernel repository.

6. The method of claim 5, further comprising:
determining a kernel assessment application reference skeleton for the kernel, wherein the kernel assessment application reference skeleton corresponds to a node's capability where the kernel assessment application is meant to execute and the kernel insights; and
merging the kernel assessment application reference skeleton with the kernel.

7. The method of claim 6, further comprising:
determining input parameters for the kernel;
identifying kernel invocations in the application; and
inserting code to collect input values in the application around the kernel invocations.

8. The method of claim 7, wherein the application is executed in the cloud infrastructure, and the input values are collected and stored as kernel assessment insights.

9. The method of claim 1, wherein the kernel insights include efficiencies with each type of available accelerator in the cloud infrastructure.

10. A non-transitory machine-readable storage medium having stored therein computer program code which, when executed by a computer, carries out operations of assessment of applications in a cloud infrastructure comprising:
generating a kernel assessment application to analyze an application to be executed on the cloud infrastructure, wherein generating the kernel assessment application comprises:
parsing hardware accelerated application code in the application;
identifying a kernel in the hardware accelerated application code, wherein the kernel is a highly parallel computing task of the hardware accelerated application code; and
extracting kernel information including kernel logic, input data, data types, and dependencies for the kernel;
deploying the kernel assessment application in the cloud infrastructure;
executing the kernel assessment application in the cloud infrastructure, thereby executing the kernel;

collecting kernel insights, while executing the kernel, for at least deciding, based on collected kernel insights, on which accelerator the kernel should be executed; and storing the kernel insights collected from the kernel assessment application to be utilized for executing the application in the cloud infrastructure.

11. A computing node for assessment of applications in a cloud infrastructure comprising:

a storage medium having stored therein an application kernel assessment framework; and a set of processors, including general purpose processors and accelerators, to execute the application kernel assessment framework to cause the computing node to:

generate a kernel assessment application to analyze an application to be executed on the cloud infrastructure, wherein to generate the kernel assessment application comprises:

parse hardware accelerated application code in the application;

identify a kernel in the hardware accelerated application code, wherein the kernel is a highly parallel computing task of the hardware accelerated application code; and extract kernel information including kernel logic, input data, data types, and dependencies for the kernel;

deploy the kernel assessment application in the cloud infrastructure;

execute the kernel assessment application in the cloud infrastructure, thereby to execute the kernel;

collect kernel insights, while execution of the kernel, for at least to decide, based on collected kernel insights, on which accelerator the kernel should be executed; and store the kernel insights collected from the kernel assessment application to be utilized for executing the application in the cloud infrastructure.

12. The computing node of claim 11 further to:

discover capabilities of the cloud infrastructure, wherein the collected kernel insights are correlated with the capabilities of the cloud infrastructure.

13. The computing node of claim 12, wherein the capabilities of the cloud infrastructure include to identify a plurality of accelerators in the cloud infrastructure.

14. The computing node of claim 12, wherein to discover the capabilities of the cloud infrastructure is further to:

deploy a node capabilities discovery application to collect hardware and software capabilities to each compute node in the cloud infrastructure.

15. The computing node of claim 11, wherein to generate the kernel assessment application is further to:

store extracted kernel information in an extracted kernel repository.

16. The computing node of claim 15, further to:

determine a kernel assessment application reference skeleton for the kernel, wherein the kernel assessment application reference skeleton corresponds to a node's capability where the kernel assessment application is meant to execute the kernel insights; and merge the kernel assessment application reference skeleton with the kernel.

17. The computing node of claim 16, further to:

determine input parameters for the kernel;

identify kernel invocations in the application; and insert code to collect input values in the application around the kernel invocations.

18. The computing node of claim 17, wherein the application is to be executed in the cloud infrastructure, and the input values are collected and stored as kernel assessment insights.

19. The computing node of claim 11, wherein the kernel insights include efficiencies with each type of available accelerator in the cloud infrastructure.

20. The non-transitory machine-readable storage medium of claim 10 further carries out operations comprising:

discovering capabilities of the cloud infrastructure, wherein the collected kernel insights are correlated with the capabilities of the cloud infrastructure.

* * * * *